United States Patent
Macy et al.

(10) Patent No.: US 7,395,302 B2
(45) Date of Patent: *Jul. 1, 2008

(54) METHOD AND APPARATUS FOR PERFORMING HORIZONTAL ADDITION AND SUBTRACTION

(75) Inventors: William W. Macy, Palo Alto, CA (US); Eric Debes, Santa Clara, CA (US); Mark J. Buxton, Chandler, AZ (US); Patrice Roussel, Portland, OR (US); Julien Sebot, Hillsboro, OR (US); Huy V. Nguyen, Pflugerville, TX (US)

(73) Assignee: Intel Corporation, Santa Clara, CA (US)

( * ) Notice: Subject to any disclaimer, the term of this patent is extended or adjusted under 35 U.S.C. 154(b) by 690 days.

This patent is subject to a terminal disclaimer.

(21) Appl. No.: 10/610,784

(22) Filed: Jun. 30, 2003

(65) Prior Publication Data

US 2004/0078404 A1 Apr. 22, 2004

Related U.S. Application Data

(63) Continuation-in-part of application No. 10/193,645, filed on Jul. 9, 2002, now Pat. No. 6,961,845, and a continuation-in-part of application No. 09/952,891, filed on Oct. 29, 2001, now Pat. No. 7,085,795, which is a continuation of application No. 09/053,401, filed on Mar. 31, 1998, now Pat. No. 6,418,529.

(51) Int. Cl.
*G06F 7/50* (2006.01)
(52) U.S. Cl. ...................... 708/670; 712/221
(58) Field of Classification Search .................. 708/670
See application file for complete search history.

(56) References Cited

U.S. PATENT DOCUMENTS 3,711,692 A 1/1973 Batcher (Continued)

FOREIGN PATENT DOCUMENTS

EP 0 318 957 A3 6/1989

(Continued)

OTHER PUBLICATIONS

21164 Alpha Microprocessor Data Sheet, Samsung Electronics, 1997, pp. I-vii, 1, 2-1 through 2-6, 3-1 through 3-14, 4-1 through 4-10, 49-51, 55-59, 63-77.

(Continued)

*Primary Examiner*—D. H. Malzahn
(74) *Attorney, Agent, or Firm*—Blakely, Sokoloff, Taylor & Zafman LLP

(57) ABSTRACT

A method and apparatus for including in a processor instructions for performing horizontal intra-add operations on packed data. One embodiment of the processor is coupled to a memory. The memory has stored therein at least a first packed data. The processor performs operations on data elements in the first packed data to generate a plurality of data elements in a second packed data in response to receiving an instruction. At least two of the plurality of data elements in the second packed data store the results of an intra-add operation, at least one of these results coming from the operation on data elements of the first packed data. One embodiment of a software method utilizes horizontal intra-add instructions for performing butterfly computations as may be employed, for example, in Walsh-Hadamard transforms or in Fast-Fourier Transforms.

26 Claims, 25 Drawing Sheets

| x3 | x2 | x1 | x0 | Source1 |

| y3 | y2 | y1 | y0 | Source2 |

| y2 + y3 | y0 + y1 | x2 + x3 | x0 + x1 | Result |

U.S. PATENT DOCUMENTS

| | | | |
|---|---|---|---|
| 3,723,715 A | 3/1973 | Chen et al. | |
| 4,161,784 A | 7/1979 | Cushing et al. | |
| 4,189,716 A | 2/1980 | Krambeck | |
| 4,393,468 A | 7/1983 | New | |
| 4,418,383 A | 11/1983 | Doyle et al. | |
| 4,498,177 A | 2/1985 | Larson | |
| 4,630,192 A | 12/1986 | Wassel et al. | |
| 4,707,800 A | 11/1987 | Montrone et al. | |
| 4,760,525 A | 7/1988 | Webb | |
| 4,771,379 A | 9/1988 | Ando et al. | |
| 4,785,393 A | 11/1988 | Chu et al. | |
| 4,785,421 A | 11/1988 | Takahashi et al. | |
| 4,901,270 A | 2/1990 | Galbi et al. | |
| 4,989,168 A | 1/1991 | Kuroda et al. | |
| 5,095,457 A | 3/1992 | Jeong | |
| 5,187,679 A | 2/1993 | Vassiliadis et al. | |
| 5,201,056 A | 4/1993 | Daniel et al. | |
| 5,327,369 A | 7/1994 | Ashkenazi | |
| 5,339,447 A | 8/1994 | Balmer | |
| 5,390,135 A | 2/1995 | Lee et al. | |
| 5,418,736 A | 5/1995 | Widigen et al. | |
| 5,442,799 A | 8/1995 | Murakami et al. | |
| 5,448,703 A | 9/1995 | Amini et al. | |
| 5,517,626 A | 5/1996 | Archer et al. | |
| 5,530,661 A | 6/1996 | Garbe et al. | |
| 5,537,601 A | 7/1996 | Kimura et al. | |
| 5,541,865 A | 7/1996 | Ashkenazi | |
| 5,586,070 A | 12/1996 | Pucell | |
| 5,677,862 A | 10/1997 | Peleg et al. | |
| 5,678,009 A | 10/1997 | Bains et al. | |
| 5,721,697 A | 2/1998 | Lee | |
| 5,721,892 A | 2/1998 | Peleg et al. | |
| 5,734,874 A | 3/1998 | Van Hook et al. | |
| 5,815,421 A | 9/1998 | Dulong et al. | |
| 5,819,117 A | 10/1998 | Hansen | |
| 5,822,232 A | 10/1998 | Dulong et al. | |
| 5,859,790 A | 1/1999 | Sidwell | |
| 5,862,067 A | 1/1999 | Mennemeier et al. | |
| 5,875,355 A | 2/1999 | Sidwell et al. | |
| 5,880,984 A | 3/1999 | Burchfiel et al. | |
| 5,880,985 A | 3/1999 | Makineni et al. | |
| 5,883,824 A | 3/1999 | Lee et al. | |
| 5,887,186 A | 3/1999 | Nakanishi | |
| 5,901,301 A | 5/1999 | Matsuo et al. | |
| 5,918,062 A | 6/1999 | Oberman et al. | |
| 5,983,256 A * | 11/1999 | Peleg et al. | 708/523 |
| 5,983,257 A | 11/1999 | Dulong et al. | |
| 6,006,316 A | 12/1999 | Dinkjian | |
| 6,014,684 A | 1/2000 | Hoffman | |
| 6,014,735 A | 1/2000 | Chennupaty et al. | |
| 6,016,538 A * | 1/2000 | Guttag et al. | 712/32 |
| 6,041,404 A | 3/2000 | Roussel et al. | |
| 6,115,812 A | 9/2000 | Abdallah et al. | |
| 6,122,725 A | 9/2000 | Roussel et al. | |
| 6,211,892 B1 | 4/2001 | Huff et al. | |
| 6,212,618 B1 | 4/2001 | Roussel | |
| 6,230,253 B1 | 5/2001 | Roussel et al. | |
| 6,230,257 B1 | 5/2001 | Roussel et al. | |
| 6,240,437 B1 * | 5/2001 | Guttag et al. | 708/524 |
| 6,288,723 B1 | 9/2001 | Huff et al. | |
| 6,370,558 B1 * | 4/2002 | Guttag et al. | 708/603 |
| 6,418,529 B1 | 7/2002 | Roussel | |
| 6,961,845 B2 | 11/2005 | Roussel | |

FOREIGN PATENT DOCUMENTS

| | | |
|---|---|---|
| FR | 2563349 | 10/1985 |
| WO | 97/08608 A1 | 3/1997 |
| WO | WO-9708610 | 3/1997 |
| WO | 97/23821 | 7/1997 |

OTHER PUBLICATIONS

"64-bit and Multimedia Extensions in the PA-RISC 2.0 Architecture", Computing Directory Technologies Precision Architecture Document, Jul. 17, 1997.

AMD-3D Technology Manual, Advance Micro Devices, Inc. (AMD), Publication #21928, Feb. 1998, pp. i-x, 1-58.

Barad, et al., "Intel's Multimedia Architecture Extension", 19th Convention of Electrical and Electronics Engineers in Israel, 1996, pp. 148-151.

"Bit Zone Accumulator", IMB Technical Disclosure Bulletin (XP000 308791), vol. 35, No. 1A, Jun. 1992, p. 106.

Case, "Philips Hopes to Displace DSPs with VLIW", Microprocessor Report, Dec. 1994, pp. 12-15.

"Errata to MC88110 Second Generation RISC Microprocessor User's Manual", Motorola Semiconductor Technical Data (Doc. # MC8810UMA/AD), Motorola Inc., Sep. 1992.

Gwennap, "New PA-RISC Processor Decodes MPEG Video", Microprocessor Report, Jan. 1994, pp. 16-17.

Hansen, "Architecture of a Broadband Mediaprocessor", Proceedings of COMPCON '96, 1996, pp. 334-354.

Intel i750, i860, i960 Processors and Related Products, 1993 pp. 1-3.

Levinthal, et al., "Parallel Computers for Graphics Applications," Proceedings: ASPLOS II, Oct. 1987, pp. 193-198.

Levinthal et al., Chap—A SIMD Graphics Processor, Computer Graphics, vol. 18 No. 3, Jul. 1984, pp. 77-82.

MC88110 Programmer's Reference Guide, Motorola Semiconductor Technical Data, Rev. 1, Dec. 1992, Doc. #MC88110PRG/D, Motorola Inc., 1992, pp. 1-5.

MC88110 Second Generation RISC Microprocessor User's Manual, Doc. #MC8110UM/AD, Motorola Inc., 1991.

MIPS V Instruction Set, MIPS V Specification, Rev. 1.0, SiliconGraphics, Inc., pp. B-1 through B-37.

MIPS Digital Media Extension, Rev. 1.0, SiliconGraphics, Inc., pp. C-1 through C-40.

MIPS Extension for Digital Media with 3D, MIPS Technology, Inc. Mar. 12, 1997, pp. 0-26.

Peleg, et al., U.S. Appl. No. 08/521,360, "A Set of Instructions for Operating on a Packed Data"; filed Aug. 31, 1995; assigned to Intel Corporation; now abandoned.

Shipnes, "Graphics Processing with the 88110 RISC Microprocessor", IEEE (1992), pp. 169-174.

Slater, Michael, "MicroUnity Lifts Veil on MediaProcessor: New Architecture Designed for Broadband Communication," Microprocessor Report, Oct. 23, 1995, pp. 11-18.

"Silicon Graphics Introduces Enhanced MIPS Architecture to Lead the Interactive Digital Revolution", SiliconGraphics, Inc. Oct. 21, 1996, pp. 1-2.

"UltraSPARC Multimedia Capabilities On-Chip Support for Real-Time Video and Advanced Graphics", SPARC Technology Business, Sun Microsystems, Sep. 1994.

Tasic, et al., "Comparison of Some Parallel Matrix Multiplication Algorithms", 8th Mediterranean Electrotechnical Conference, Melecon '96, vol. 1, 1996, pp. 155-158.

TM100 Preliminary Data Book, Philips Semiconductors, Jul. 1, 1997, pp. A-74, A133-138, A161.

TMS320C2x User's Guide, Digital Signal Processing Products, Texas Instruments, 1993, pp. 3-2 through 3-11; pp. 3-28 through 3-34; pp. 4-1 through 4-22; pp. 4-41, 4-103 through 4-120; pp. 4-122, 4-150 through 4-151.

Wang, Y.,et al., A Processor Architecture for 3D Graphics Calculations, Computer Motion, Inc., pp. 1-23.

VIS Instruction Set User's Manual (Part #805-1394-01), Sun Microsystems, Jul. 1997, pp. i-xii, 1-136.

"COMPLAINT", In the United States District Court for the District of Delaware, In the matter of *Transmeta v. Intel Corporation*, (Oct. 11, 2006), 1-7.

"First Amended Complaint", In the United States District Court for the District of Delaware, In the matter of *Transmeta Corporation v. Intel Corporation*, C.A. No. 06-663 (GMS), (Dec. 12, 1006), 1-8.

"Intel Corporation's Answer, Affirmative Defenses, and Counterclaims to Transmeta's First Amended Complaint", In the United States District Court for the District of Delaware, In the matter of *Transmeta Corporation* v. *Intel Corporation*, Civil Action No. 06-663-GMS, (Jan. 9, 2007), 1-27.

"Transmeta Corporation's Reply to Intel Corporation's Counterclaims to the First Amended Complaint", In the United States District Court for the District of Delaware, In the matter of *Transmeta* v. *Intel Corporation*, (Feb. 28, 2007), 1-20.

"Transmeta Corporation's Responses to Intel Corporation's First Set of Interrogatories (Nos. 1-20)", In the United States District Court for the District of Delaware, In the matter of *Transmeta Corporation* v. *Intel Corporation*, Redacted, (May 21, 2007), 42 pages.

Control Data Corporation, "Control Data 6400/6500/6600 Computer Systems Reference Manual", Pub. No. 60100000, (1967), 159 pages.

Fuller, Sam , "Motorola's AltiVec Technology", *Freescale Semiconductor, Inc.*, www.freescale.com/files/32bit/doc/fact_sheet/ALTIVECWP.pdf, (1998), 1-4.

Intel Corporation, "Intel 80386 Programmer's Reference Manual", (1986), 421 pages.

Kohn, L. , et al., "The Visual Instruction Set (VIS) in UltraSPARC", *SPARC Technology Business—Sun Microsystems, Inc.*, (1995), pp. 462-469.

Lamport, Leslie , "Multiple Byte Processing With Full-Word Instructions", *ACM*, (1975), pp. 471-475.

Levinthal, Adam , et al., "Parallel Computers for Graphics Applications", *Pixar*, San Rafael, CA, (1987), 193-198.

Peleg, Alexander D., et al., "Microprocessor Providing a Set of Operations for Packed Data", U.S. Appl. No. 08/521,360, abandoned., (Aug. 31, 1995), 164 pages.

Philips Electronics, "TriMedia TM1000 Preliminary Data Book", (1997), 496 pages.

Rubinfeld, Paul , et al., "Motion Video Instruction Extensions for Alpha", (Oct. 18, 1996), 13 pages.

Samsung Electronics, "21164 Alpha Microprocessor Data Sheet", (1997), 121 pages.

Sun Microsystems, Inc., "Visual Instruction Set (VIS) User's Guide", *Version 1.1*, (Mar. 1997), pp. i-xii, 1-127.

* cited by examiner

| x3 | x2 | x1 | x0 | Source1 |
|---|---|---|---|---|
| y3 | y2 | y1 | y0 | Source2 |
| x3 + y3 | x2 + y2 | x1 + y1 | x0 + y0 | Result |

$F(k) = (1/2) \cdot (F_{even}(k) + F_{odd}(k) \cdot W_N^K)$ $F(k+N/2) = (1/2) \cdot (F_{even}(k) - F_{odd}(k) \cdot W_N^K)$

| x3 | x2 | x1 | x0 | Source1 |
| --- | --- | --- | --- | --- |
| y3 | y2 | y1 | y0 | Source2 |
| y2 + y3 | y0 + y1 | x2 + x3 | x0 + x1 | Result |

| x3 | x2 | x1 | x0 | Source1 |
| y3 | y2 | y1 | y0 | Source2 |
| y2 - y3 | y0 - y1 | x2 - x3 | x0 - x1 | Result |

FIG. 3b

| x1 | x0 | Source1 |
| y1 | y0 | Source2 |
| y1 + y0 | x0 + x1 | Result |

FIG. 3c

| x3 | x2 | x1 | x0 | Source1 |
| y3 | y2 | y1 | y0 | Source2 |
| y2 + y3 | y1 − y0 | x2 + x3 | x1 − x0 | Result |

FIG. 3d

MULTIPLY – STAGE1 INPUTS1, WEIGHT1

| $f_6$ | $f_2$ | $f_4$ | $f_0$ | Inputs1 |
|---|---|---|---|---|
| $W_8^0/2$ | $1/2$ | $W_8^0/2$ | $1/2$ | Weight1 |
| $f_6 W_8^0/2$ | $f_2/2$ | $f_4 W_8^0/2$ | $f_0/2$ | IResult1 |

FIG. 4a

MULTIPLY – STAGE1 INPUTS2, WEIGHT1

| $f_7$ | $f_3$ | $f_5$ | $f_1$ | Inputs2 |
|---|---|---|---|---|
| $W_8^0/2$ | $1/2$ | $W_8^0/2$ | $1/2$ | Weight1 |
| $f_7 W_8^0/2$ | $f_3/2$ | $f_5 W_8^0/2$ | $f_1/2$ | IResult2 |

FIG. 4b

INTRA-ADD: DATA ELEMENTS OF IRESUT1, IRESULT2

| $f_6 W_8^0/2$ | $f_2/2$ | $f_4 W_8^0/2$ | $f_0/2$ | IResult1 |
|---|---|---|---|---|
| $f_7 W_8^0/2$ | $f_3/2$ | $f_5 W_8^0/2$ | $f_1/2$ | IResult2 |
| $(f_3+f_7 W_8^0)/2$ | $(f_1+f_5 W_8^0)/2$ | $(f_2+f_6 W_8^0)/2$ | $(f_0+f_4 W_8^0)/2$ | R3-R0 |

FIG. 4c

INTRA-SUBTRACT: DATA ELEMENTS OF IRESUT1, IRESULT2

| $f_6 W_8^0/2$ | $f_2/2$ | $f_4 W_8^0/2$ | $f_0/2$ | IResult1 |
|---|---|---|---|---|
| $f_7 W_8^0/2$ | $f_3/2$ | $f_5 W_8^0/2$ | $f_1/2$ | IResult2 |
| $(f_3-f_7 W_8^0)/2$ | $(f_1-f_5 W_8^0)/2$ | $(f_2-f_6 W_8^0)/2$ | $(f_0-f_4 W_8^0)/2$ | S3-S0 |

FIG. 4d

MULTIPLY – STAGE2 R3-R0, WEIGHT1

| $r_3$ | $r_2$ | $r_1$ | $r_0$ | R3-R0 |
|---|---|---|---|---|
| $W_8^0/2$ | $1/2$ | $W_8^0/2$ | $1/2$ | Weight1 |
| $r_3 W_8^0/2$ | $r_2/2$ | $r_1 W_8^0/2$ | $r_0/2$ | IResult3 |

FIG. 4e

MULTIPLY – STAGE2 S3-S0, WEIGHT2

| $s_3$ | $s_2$ | $s_1$ | $s_0$ | S3-S0 |
|---|---|---|---|---|
| $W_8^2/2$ | $1/2$ | $W_8^2/2$ | $1/2$ | Weight2 |
| $s_3 W_8^2/2$ | $s_2/2$ | $s_1 W_8^2/2$ | $s_0/2$ | IResult4 |

FIG. 4f

INTRA-ADD: DATA ELEMENTS OF IRESUT3, IRESULT4

| $r_3W_8^0/2$ | $r_2/2$ | $r_1W_8^0/2$ | $r_0/2$ | IResult3 |
|---|---|---|---|---|
| $s_3W_8^2/2$ | $s_2/2$ | $s_1W_8^2/2$ | $s_0/2$ | IResult4 |
| $(s_2+s_3W_8^2)/2$ | $(s_0+s_1W_8^2)/2$ | $(r_2+r_3W_8^0)/2$ | $(r_0+r_1W_8^0)/2$ | T3-T0 |

FIG. 4g

INTRA-SUBTRACT: DATA ELEMENTS OF IRESUT3, IRESULT4

| $r_3W_8^0/2$ | $r_2/2$ | $r_1W_8^0/2$ | $r_0/2$ | IResult3 |
|---|---|---|---|---|
| $s_3W_8^2/2$ | $s_2/2$ | $s_1W_8^2/2$ | $s_0/2$ | IResult4 |
| $(s_2-s_3W_8^2)/2$ | $(s_0-s_1W_8^2)/2$ | $(r_2-r_3W_8^0)/2$ | $(r_0-r_1W_8^0)/2$ | U3-U0 |

FIG. 4h

MULTIPLY – STAGE3 T3-T0, WEIGHT3

| $t_3$ | $t_2$ | $t_1$ | $t_0$ | T3-T0 |
|---|---|---|---|---|
| $W_8^1/2$ | $1/2$ | $W_8^0/2$ | $1/2$ | Weight3 |
| $t_3 W_8^1/2$ | $t_2/2$ | $t_1 W_8^0/2$ | $t_0/2$ | IResult5 |

FIG. 4i

MULTIPLY – STAGE3 U3-U0, WEIGHT4

| $u_3$ | $u_2$ | $u_1$ | $u_0$ | U3-U0 |
|---|---|---|---|---|
| $W_8^3/2$ | $1/2$ | $W_8^2/2$ | $1/2$ | Weight4 |
| $u_3 W_8^3/2$ | $u_2/2$ | $u_1 W_8^2/2$ | $u_0/2$ | IResult6 |

FIG. 4j

INTRA-ADD: DATA ELEMENTS OF IRESUT5, IRESULT6

| $t_3 W_8^1/2$ | $t_2/2$ | $t_1 W_8^0/2$ | $t_0/2$ | IResult5 |
|---|---|---|---|---|
| $u_3 W_8^3/2$ | $u_2/2$ | $u_1 W_8^2/2$ | $u_0/2$ | IResult6 |
| $(u_2+u_3 W_8^3)/2$ | $(u_0+u_1 W_8^2)/2$ | $(t_2+t_3 W_8^1)/2$ | $(t_0+t_1 W_8^0)/2$ | F3-F0 |

FIG. 4k

INTRA-SUBTRACT: DATA ELEMENTS OF IRESUT5, IRESULT6

| $t_3 W_8^1/2$ | $t_2/2$ | $t_1 W_8^0/2$ | $t_0/2$ | IResult5 |
|---|---|---|---|---|
| $u_3 W_8^3/2$ | $u_2/2$ | $u_1 W_8^2/2$ | $u_0/2$ | IResult6 |
| $(u_2-u_3 W_8^3)/2$ | $(u_0-u_1 W_8^2)/2$ | $(t_2-t_3 W_8^1)/2$ | $(t_0-t_1 W_8^0)/2$ | F7-F4 |

FIG. 4l

| 31-28 | 27-24 | 23,22 | 21,20 | 19-16 | 15-12 | 11-8 | 7-5 | 4 | 3-0 |
|---|---|---|---|---|---|---|---|---|---|
| 410 | 411 | 412 | 413 | 402 | 405 | 416 | 417 | | 403 |

| 31-16 | 15-8 | 7,6 | 5-3 | 2-0 |
|---|---|---|---|---|
| 512 | 514 | 516 | 502 | 503 |

| 39-32 | 31-16 | 15-8 | 7,6 | 5-3 | 2-0 |
|---|---|---|---|---|---|
| 610 | 612 | 614 | 616 | 602 | 603 |

| 127 112 111 | 96 95 | 80 79 | 64 63 | 48 47 | 32 31 | 16 15 | 0 |
|---|---|---|---|---|---|---|---|
| Half 7 | Half 6 | Half 5 | Half 4 | Half 3 | Half 2 | Half 1 | Half 0 |

Packed Half 721

| 127 | 96 95 | 64 63 | 32 31 | 0 |
|---|---|---|---|---|
| Single 3 | Single 2 | Single 1 | Single 0 |

Packed Single 722

| 127 | 64 63 | 0 |
|---|---|---|
| Double 1 | Double 0 |

Packed Double 723

FIG. 7b

METHOD AND APPARATUS FOR PERFORMING HORIZONTAL ADDITION AND SUBTRACTION

RELATED APPLICATIONS

This is a continuation-in-part application claiming, under 35 U.S.C. § 120, the benefit of the filing dates of U.S. application Ser. No. 09/952,891, filed Oct. 29, 2001. now U.S. Pat. No. 7,085,795; and of U.S. application Ser. No. 10/193,645, filed Jul. 9, 2002, now U.S. Pat. No. 6,961,845; which is a continuation of application Ser. No. 9/053,401, filed Mar. 31, 1998, now U.S. Pat. No. 6,418,529.

FIELD OF THE DISCLOSURE

This disclosure relates generally to the field of processors. In particular, the disclosure relates to calculation of Single-Instruction-Multiple-Data (SIMD) horizontal addition and subtraction operations.

BACKGROUND OF THE DISCLOSURE

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed on separate data elements with one instruction, resulting in significant performance improvement.

One set of SIMD instructions was defined for the Pentium® Processor with MMX™ Technology by Intel® Corporation and described in "IA-32 Intel Architecture Software Developer's Manual Volume 2: Instruction Set Reference," which is available from Intel Corporation, Santa Clara, Calif. on the world-wide-web (www) at intel.com/design/litcentr.

Currently, the SIMD addition operation only performs "vertical" or inter-register addition, where pairs of data elements, for example, a first element Xn (where n is an integer) from one operand, and a second element Yn from a second operand, are added together. An example of such a vertical addition operation is shown in FIG. 1, where the instruction is performed on the sets of data elements ($X_3$, $X_2$, $X_1$ and $X_0$) and ($Y_3$, $Y_2$, $Y_1$, and $Y_0$) accessed as Source 1 and Source2, respectively to obtain the result ($X_3+Y_3$, $X_2+Y_2$, $X_1+Y_1$, and $X_0+Y_0$).

Although many applications currently in use can take advantage of such a vertical add operation, there are a number of important applications which would require the rearrangement of the data elements before the vertical add operation can be implemented so as to provide realization of the application.

For example, an 8-point decimation in time operation of a Walsh-Hadamard transform and of a Fast-Fourier Transform (FFT) is shown in FIG. 2b. The larger 8-point transforms may be performed in stages through successive doubling. That is to say an 8-point transform can be computed from two 4-point transforms, which can be computed from four 2-point transforms. The computations at each stage are called butterflies.

A butterfly for the staged computations of FIG. 2b is shown in FIG. 2a. At each successive stage, data elements at even positions are combined with the data elements at odd positions to generate data elements of the next successive stage. In order to perform these staged computations using prior-art SIMD vertical additions and vertical subtractions, instructions substantially similar to the instruction sequence example of Table 1 may be used to shuffle and rearrange data elements for each stage.

TABLE 1

Exemplary Code To Prepare Data for Vertical-Add/Vertical-Subtract Operations:

| | | |
|---|---|---|
| movdqa | xmm7, [esi] | //shuffle pattern to put even elements in low half odd in high half |
| pshufb | xmm0, xmm7 | //shuffle data in xmm0 |
| pshufb | xmm1, xmm7 | //shuffle data in xmm1 |
| movdqa | xmm2, xmm0 | //copy xmm0 data |
| punpcklqdq | xmm0, xmm1 | //combine even elements of xmm0 and xmm1. xmm1 in high half. |
| punpckhqdq | xmm2, xmm1 | //combine odd elements of xmm2 (equal to xmm0) and xmm1. |

One drawback of this approach is that it requires additional processing time to perform the operations that shuffle and recombine the data elements between stages. Another drawback is that an additional register is used to hold a shuffle pattern for sorting the even elements into the low half of the register and the odd elements into the high half of the register. A third drawback is that the extra instructions that are required due to the necessity to rearrange data between stages reduces the code density and requires more storage in memory and in cache.

Accordingly, there is a need in the technology for providing an apparatus and method which more efficiently performs butterfly computations, such as those used in 2-point or 4-point transforms for example, without requiring additional time to perform operations that shuffle and recombine data elements. There is also a need in the technology for a method and operation for increasing code density by eliminating the necessity for the rearrangement of data elements and thereby eliminating the corresponding rearrangement operations from the code. By eliminating the necessity for the rearrangement of data elements, an additional register could also be made available that might otherwise have been used to store patterns for shuffling the odd and even data elements.

BRIEF DESCRIPTION OF THE DRAWINGS

The present invention is illustrated by way of example and not limitation in the figures of the accompanying drawings.

FIG. 3b illustrates one embodiment of a horizontal or intra-subtract operation.

FIG. 3c illustrates an alternative embodiment of a horizontal or intra-add operation.

FIG. 3d illustrates another alternative embodiment of a horizontal or intra-add-subtract operation.

FIGS. 4a-4l illustrate one embodiment of a transformation using horizontal or intra-addition/subtraction operations for performing the butterfly stages.

FIG. 6a is a depiction of an operation encoding (opcode) format for a horizontal or intra-addition/subtraction instruction.

FIG. 6b is a depiction of an alternative opcode format for a horizontal or intra-addition/subtraction instruction.

FIG. 6c is a depiction of another alternative opcode format for a horizontal or intra-addition/subtraction instruction.

FIG. 7b illustrates packed data-types in accordance with an alternative embodiment of the invention.

FIG. 8a is a flow diagram illustrating one embodiment of a process for performing the intra-add operation of FIG. 3a.

FIG. 8g is a flow diagram illustrating one alternative embodiment of a process for performing the intra-add operation of FIG. 3a.

DETAILED DESCRIPTION

Figures 1, 2A:
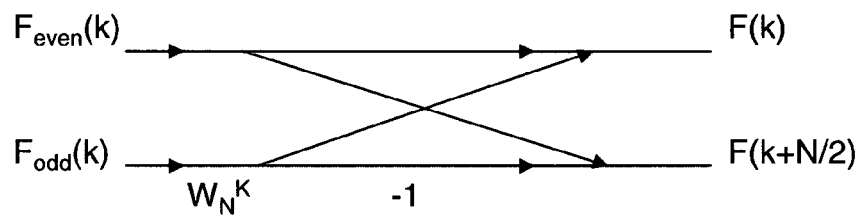
FIG. 1 illustrates the vertical or inter-add operation of the prior art.
FIG. 2a illustrates an example of a butterfly for staged computations of a Walsh-Hadamard transform and of a Fast-Fourier Transform (EFT).

Disclosed herein is a process and apparatus for performing horizontal intra-add operations on packed data. One embodiment of a processor performs operations on data elements in a first packed data to generate a plurality of data elements in a second packed data in response to receiving an instruction. At least two of the plurality of data elements in the second packed data store the results of a horizontal intra-add operation, at least one of these results coming from the operation on data elements of the first packed data. One embodiment of a software process utilizes horizontal intra-add instructions for efficiently performing butterfly computations as may be employed, for example, in Walsh-Hadamard transforms or in Fast-Fourier Transforms.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents. Some well-known circuits, structures and techniques may not be shown in detail in order not to obscure the invention.

For the purpose of the following discussion of embodiments of the present invention, illustrative terms are used. Definitions for certain such illustrative terms follows.

A computer system or data processing device or system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, and digital video or digital audio recorder/players.

A register is any device capable of storing and providing data. Further functionality of a register with respect to data formats is described below. A register is not necessarily, included on the same die or in the same package as the processor.

A wireless device or interface may be understood to mean any one of a variety of devices or interfaces for wireless communications. Examples include but are not limited to any combination of devices for one or more of the following: short-range radio, satellite communications, wireless local area networks, wireless telephony, cellular digital packet data, home radio frequency, narrowband time-division multiple access, code-division multiple access, wideband code-division multiple access, wireless fidelity or short message service.

One aspect of the present invention is a process for, or a processor including instructions for performing horizontal or intra-addition operations on packed data. In one embodiment, two pairs of data elements (e.g., $X_3$ and $X_2$, and $X_1$ and $X_0$) located within a single storage area (e.g., Source1) are added together using a horizontal or an intra-add operation. In alternate embodiments, data elements from each of two storage areas (e.g., Source 1 and Source2) are added/subtracted and stored as data elements of a resulting packed data, for example, as shown in FIGS. 3a-3d.

Another aspect of the present invention involves a method and apparatus for performing butterfly stages, for example, in Walsh-Hadamard transforms or in Fast-Fourier Transforms, using a horizontal or intra-addition/subtraction operation. For example, FIG. 2a illustrates a butterfly for the staged computations of such a transformation. At each stage of an N-point transformation, the outputs of the butterfly, F(k) and F(k+N/2) are computed from the inputs $F_{even}(k)$ and $F_{odd}(k)$ as an averaged weighted sum or difference as follows:

$$F(k) = (\tfrac{1}{2}) \cdot (F_{even}(k) + F_{odd}(k) \cdot W_N^K),$$

$$F(k+N/2) = (\tfrac{1}{2}) \cdot (F_{even}(k) - F_{odd}(k) \cdot W_N^K).$$

The weights, $W_N^K$, may very by stage depending on the type of transform. For example, in the 8-point Walsh-Hadamard transform, $W_8^K$ is equal to one. It will be appreciated that multiplications by one half (½) may also be accomplished through shift operations, for example, at each stage or shifting the weights prior to multiplying or shifting results after several stages.

Figures 2B, 3A:
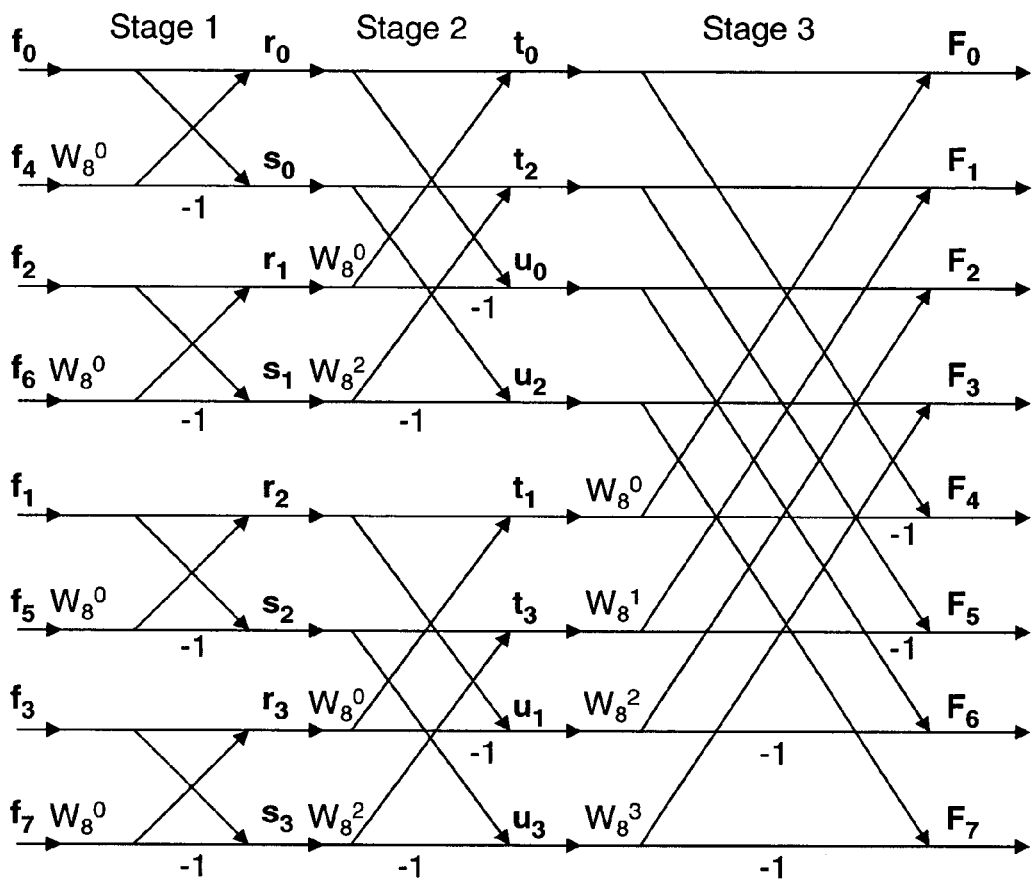
FIG. 2b illustrates an example of an 8-point decimation in time operation of a Walsh-Hadamard transform and of a Fast-Fourier Transform (FET).
FIG. 3a illustrates one embodiment of a horizontal or intra-add operation.

FIG. 2b illustrates an 8-point decimation in time operation of a Walsh-Hadamard transform and of a Fast-Fourier Transform (FFT). Values shown along the horizontal lines represent multiplication. For example $f_4$ is multiplied by the value of weight, $W_8^0$, in Stage 1 as illustrated with respect to the second horizontal line of FIG. 2b. The arrows from one horizontal line to another horizontal line at each stage signify additions or subtractions, which are further illustrated through multiplication by negative one. It will be appreciated that in practice, such operations may be accomplished through a variety of different methods, for example, multiplication by negative weight values followed by addition, multiplication by positive weight values followed by subtraction, etc. Further details of performing the transformation illustrated using intra-addition/subtraction are discussed with respect to FIGS. 4a-4l. It will be appreciated that transformations of conveniently chosen sizes may be carried out through the use of butterfly stages in a manner substantially similar to the 8-point transformation illustrated in FIG. 2b.

Through the use of horizontal or intra-addition/subtraction the butterfly stages of, for example, a Walsh-Hadamard transform may be efficiently computed. In combination with SIMD multiplication the butterfly stages of, for example, a Fast-Fourier Transform may also be efficiently computed. FIG. 3a illustrates one embodiment of the horizontal or intra-add operation. A first operand, Source 1, comprises four data elements, ($X_3$, $X_2$, $X_1$ and $X_0$). A second operand, Source2, also comprises four data elements ($Y_3$, $Y_2$, $Y_1$, and $Y_0$). In response to an intra-add instruction, a result is produced comprising four data elements respectively representing the operations, ($Y_2+Y_3$, $Y_0+Y_1$, $X_2+X_3$, and $X_0+X_1$). It will be appreciated that horizontal or intra-add operations may be performed on more (e.g. 6, 8, 10, 16, etc.) or less data elements that illustrated in FIG. 3a. It will also be appreciated that the order of data elements in a result may be varied, for example representing the operations, ($Y_0+Y_1$, $Y_2+Y_3$, $X_0+X_1$, and $X_2+X_3$) without departing from the broader spirit and scope of the invention.

It will also be appreciated that the sizes of the data elements may be conveniently chosen (e.g. 1-byte, 2-bytes, 4-bytes, 17-bits, 23-bits, 64-bits, etc.) according to the particularities of the data and/or algorithms employed. Further, such operands may comprise floating-point data, fixed-point signed data, unsigned data, binary-coded-decimal data, carry-save redundant encoded data, sign-digit redundant encoded data, etc.

FIG. 3b illustrates one embodiment of the horizontal or intra-subtract operation. As in the previous example, a first operand, Source 1, comprises four data elements, ($X_3$, $X_2$, $X_1$ and $X_0$). A second operand, Source2, also comprises four data elements ($Y_3$, $Y_2$, $Y_1$, and $Y_0$). In response to an intra-subtract instruction, a result is produced comprising four data elements respectively representing the operations, ($Y_2-Y_3$, $Y_0-Y_1$, $X_2-X_3$, and $X_0-X_1$). For an alternative embodiment of the intra-subtract instruction, a result may be produced comprising data elements representing the operations, ($Y_3-Y_2$, $Y_1-Y_0$, $X_3-X_2$, and $X_1-X_0$)

FIG. 3c illustrates an alternative embodiment of the horizontal or intra-add operation. A first operand, Source 1, comprises two data elements, ($X_1$ and $X_0$). A second operand, Source2, also comprises two data elements ($Y_1$, and $Y_0$). In response to an intra-subtract instruction, a result is produced comprising two data elements respectively representing the operations, ($Y_0+Y_1$, and $X_0+X_1$). Similarly, in response to an intra-subtract instruction, a result may be produced comprising two data elements respectively representing the operations, ($Y_0-Y_1$, and $X_0-X_1$).

FIG. 3d illustrates another alternative embodiment of the horizontal or intra-add-subtract operation. As in the example of FIGS. 3a and 3b, a first operand, Source1, comprises four data elements, ($X_3$, $X_2$, $X_1$ and $X_0$), and a second operand, Source2, comprises four data elements ($Y_3$, $Y_2$, $Y_1$, and $Y_0$). In response to an intra-add-subtract instruction, a result is produced comprising four data elements respectively representing the operations, ($Y_2+Y_3$, $Y_1-Y_0$, $X_2+X_3$, and $X_1-X_0$). For an alternative embodiment of the intra-add-subtract instruction, a result may be produced comprising data elements representing the operations, ($Y_2-Y_3$, $Y_0+Y_1$, $X_2-X_3$, and $X_0+X_1$).

It will be appreciated that while the following example illustrates an 8-point transformation using intra-add/subtract operations similar to those illustrated in FIGS. 3a and 3b. Other transformation examples may be more readily adapted to an alternative embodiment of intra-addition/subtraction.

In one embodiment of a transformation, each 16-bit data element from a first source is multiplied with corresponding 16-bit data elements from a second source, for example, as shown in FIGS. 4a & 4b, generating two 64-bit intermediate results, each of which are stored in separate storage areas. Intra-add and intra-subtract operations are performed on each of the intermediate results to generate a plurality of data elements, which are stored as packed results, for example, as shown in FIGS. 4c & 4d.

In an alternative embodiment of a transformation, each 32-bit data element from a first source is multiplied with corresponding 32-bit data elements from a second source, as shown in FIGS. 4a & 4b, generating two 128-bit intermediate results, each of which are stored in separate storage areas. Intra-add and intra-subtract operations are then performed on each of the 128-bit intermediate results to generate a plurality of 32-bit data elements, which are stored as packed results, as shown in FIGS. 4c & 4d. For one embodiment of a transformation, each data element is a fixed-point number or an integer. For an alternative embodiment of a transformation, each data element is a floating-point number.

Now turning to the example illustrated, and following the computations with respect to the 8-point transformation illustrated in FIG. 2b, it will be appreciated that FIGS. 4a-4d compute the four butterflies of Stage 1.

For example in FIG. 4a, a first operand, Inputs 1, comprises four data elements, ($f_6$, $f_2$, $f_4$ and $f_0$), and a second operand, Weight1, comprises four coefficients ($w_8^0/2$, ½, $W_8^0/2$, and ½). In response to a SIMD multiply instruction, an intermediate result, IResult1, is produced comprising four data elements respectively representing the operations, ($f_6 \cdot W_8^0/2$, $f_2/2$, $f_4 \cdot W_8^0/2$, and $f_0/2$). Likewise in FIG. 4b, a first operand, Inputs2, comprises four data elements, ($f_7$, $f_3$, $f_5$ and $f_1$), and the second operand, Weight1, comprises the four coefficients ($W_8^0/2$, ½, $W_8^0/2$, and ½). In response to a second SIMD multiply instruction, a second intermediate result, IResult2, is produced comprising four data elements respectively representing the operations, ($f_7 \cdot W_8^0/2$, $f_3/2$, $f_5 \cdot W_8^0/2$, and $f_1/2$).

Then in FIG. 4c, IResult1 and IResult2 are combined in response to an intra-add instruction, to produce a result comprising four data elements respectively representing the operations, (($f_3+f_7 \cdot W_8^0)/2$, ($f_1+f_5 \cdot W_8^0)/2$, ($f_2+f_6 \cdot W_8^0)/2$, and ($f_0+f_4 \cdot W_8^0)/2$), which correspond to the input elements of Stage2 of FIG. 2b, ($r_3$, $r_2$, $r_1$ and $r_0$) respectively. In FIG. 4d, IResult1 and IResult2 are combined in response to an intra-subtract instruction, to produce a result comprising four data elements respectively representing the operations, (($f_3-f_7 \cdot W_8^0)/2$, ($f_1-f_5 \cdot W_8^0)/2$, ($f_2-f_6 \cdot W_8')/2$, and ($f_0-f_4 \cdot W_8^0)/2$), which correspond to the input elements of Stage2 of FIG. 2b, ($s_3$, $s_2$, $s_1$ and $s_0$) respectively. It will be appreciated that for one embodiment of the operations of each stage only three registers may be required thereby permitting multiple transformations to be executed in parallel or larger transformations on more data elements.

In FIG. 4e, the Stage 2 input elements, ($r_3$, $r_2$, $r_1$ and $r_0$), and Weight1, ($W_8^0/2$, ½, $W_8^0/2$, and ½) are combined in response to a SIMD multiply instruction, to generate a third intermediate result, IResult3, comprising four data elements respectively representing the operations, ($r_3 \cdot W_8^0/2$, $r_2/2$, $r_1 \cdot W_8^0/2$, and $f_0/2$). In FIG. 4f, Stage 2 input elements, ($s_3$, $s_2$, $s_1$ and $s_0$), and a second operand, Weight2, comprising four coefficients ($W_8^2/2$, ½, $W_8^2/2$, and ½) are combined in response to a SIMD multiply instruction to generate a fourth intermediate result, IResult4, comprising four data elements respectively representing the operations, ($s_3 \cdot W_8^2/2$, $s_2/2$, $s_1 \cdot W_8^2/2$, and $s_0/2$).

Then in FIG. 4g, IResult3 and IResult4 are combined in response to an intra-add instruction, to produce a result comprising four data elements respectively representing the operations, (($s_2+s_3 \cdot W_8^2$)/2, ($s_0+s_1 \cdot W_8^2$)/2, ($r_2+r_3 \cdot W_8^0$)/2, and ($r_0+r_1 \cdot W_8^0$)/2), which correspond to the input elements of Stage 3 of FIG. 2b, ($t_3$, $t_2$, $t_1$ and $t_0$) respectively. In FIG. 4h, IResult3 and IResult4 are combined in response to an intra-subtract instruction, to produce a result comprising four data elements respectively representing the operations, (($s_2-s_3 \cdot W_8^2$)/2, ($s_0-s_1 \cdot W_8^2$)/2, ($r_2-r_3 \cdot W_8^0$)/2, and ($r_0-r_1 \cdot W_8^0$)/2), which correspond to the input elements of Stage 3 of FIG. 2b, ($u_3$, $u_2$, $u_1$ and $u_0$) respectively.

In FIG. 4i, these Stage 3 input elements, ($t_3$, $t_2$, $t_1$ and $t_0$), and a second operand, Weight3, comprising four coefficients ($W_8^1/2$, ½, $W_8^0/2$, and ½) are combined in response to a SIMD multiply instruction, to generate a fifth intermediate result, IResult5, comprising four data elements respectively representing the operations, ($t_3 \cdot W_8^1/2$, $t_2/2$, $t_1 \cdot W_8^0/2$, and $t_0/2$). In FIG. 4j, Stage 3 input elements, ($u_3$, $u_2$, $u_1$ and $u_0$), and a second operand, Weight4, comprising four coefficients ($W_8^3/2$, ½, $W_8^2/2$, and ½) are combined in response to a SIMD multiply instruction to generate a sixth intermediate result, IResult6, comprising four data elements respectively representing the operations, ($u_3 \cdot W_8^3/2$, $u_2/2$, $u_1 \cdot W_8^2/2$, and $u_0/2$).

Finally in FIG. 4k, IResult5 and IResult6 are combined in response to an intra-add instruction, to produce a result comprising four data elements respectively representing the operations, (($u_2+u_3 \cdot W_8^3$)/2, ($u_0+u_1 \cdot W_8^2$)/2, ($t_2+t_3 \cdot W_8^1$)/2, and ($t_0+t_1 \cdot W_8^0$)/2), which correspond to the desired output elements of FIG. 2b, ($F_3$, $F_2$, $F_1$ and $F_0$) respectively. In FIG. 4l, IResult5 and IResult6 are combined in response to an intra-subtract instruction, to produce a result comprising four data elements respectively representing the operations, (($u_2-u_3 \cdot W_8^3$)/2, ($u_0-u_1 \cdot W_8^2$)/2, ($t_2-t_3 \cdot W_8^1$)/2, and ($t_0-t_1 \cdot W_8^0$)/2), which correspond to the output elements of FIG. 2b, ($F_7$, $F_6$, $F_5$ and $F_4$) respectively.

For alternative embodiments of a transformation, additional SIMD instructions may also be useful (e.g. SIMD shift operations for adjusting fixed-point data). For one alternative embodiment of a transformation, vertical or inter-add/subtract operations may also be used in conjunction with horizontal or intra-add/subtract operations, for example, in subsequent stages to perform transformations on more than eight input values. For another embodiment of a transformation, subsequent applications of separable transformations may be used to perform a higher dimensional transformation. It will also be appreciated that while the transformation illustrated uses a radix-2 algorithm, other algorithms (e.g. radix-4 or split-radix) may be used instead.

One embodiment of FIGS. 4a-4l illustrates an example using an integer data format in which the result register may be of the same size as the source register(s). In alternative embodiments, the width of the data stored in a result register may differ from that of the source register(s), for example, to store the full width of the products generated in FIGS. 4a & 4b in a result register. In other alternative embodiments a floating point data format may be used. In alternative embodiments, the width of the packed data stored in the source register(s) and the result register may comprise 128-bits, or 256-bits, 320-bits or some other conveniently chosen size. In addition, although the discussions above pertain to packed operands that have four data elements, alternative embodiments may involve packed operands that have at least two data elements (i.e., that are double wide).

Computer System

Figure 5A:
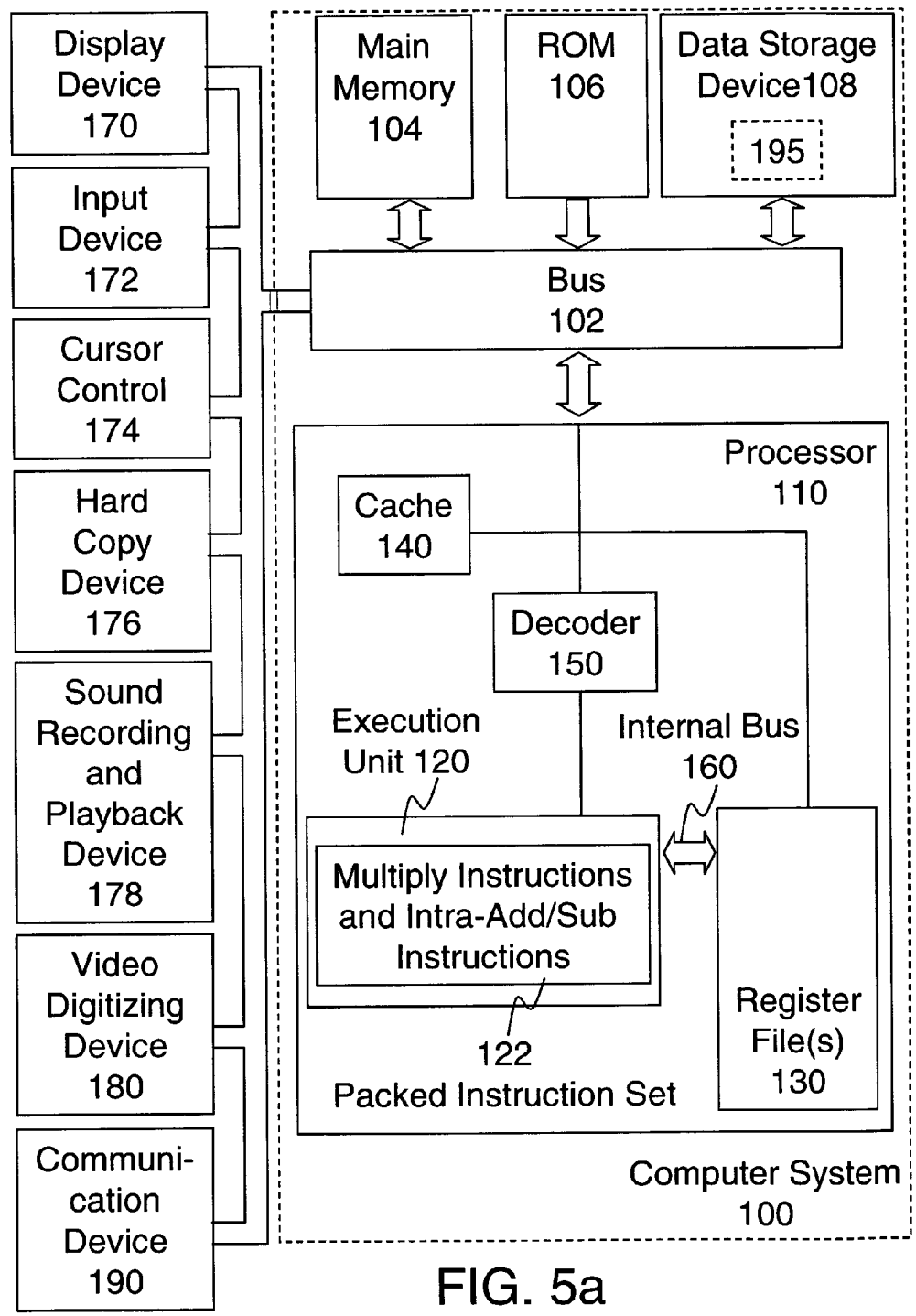
FIG. 5a illustrates an example of a computer system in accordance with one embodiment of the invention.

FIG. 5a illustrates one embodiment of a computer system 100 which implements the principles of the present invention. Computer system 100 comprises a bus 102 for communicating information, and a processor 110 for processing information. In one embodiment, the bus 102 may be any communications hardware and/or software for communicating information. The processor 110 represents a central processing unit of any type of architecture, examples of which include a CISC, a RISC or a VLIW type architecture. Processor 110 may be suitable for manufacture in one or more process technologies and by being represented on a machine readable media in sufficient detail, may be suitable to facilitate said manufacture.

Computer system 100 further comprises a main memory 104 that is coupled to bus 102, for storing information and instructions to be executed by the processor 110. Computer system 110 also comprises a read only memory (ROM) 106 and/or other status storage device, coupled to the bus 102 for storing information and instructions for access and execution by processor 110. In addition, computer system 110 comprises a data storage device 108 that is coupled to the bus 102 for storing information and instructions.

As shown in FIG. 5a, processor 110 comprises an execution unit 120, a set of register file(s) 130, a cache memory 140, a decoder 150 and an internal bus 160. The processor 110 also includes additional circuitry (not shown) which is not necessary to the understanding of the present invention.

Execution unit 120 is used for executing instructions received by processor 110. In addition to recognizing instructions typically implemented in general purpose processors, execution unit 120 recognizes instructions in packed instruction set 122 for performing operations on packed data formats. Packed instruction set 122 includes instructions for supporting intra-add/subtract and multiply operations. In addition, packed instruction set 122 may also include other packed instructions.

Execution unit 120 is coupled to register file 130 by internal bus 160. Register file 130 represents a storage area on processor 110 for storing information, including data. It is understood that the aspects of the invention are the described intra-add/subtract instruction set and a code sequence for performing transformations for operating on packed data. According to these aspects of the invention, the storage area used for storing the packed data is not critical. Execution unit 120 is coupled to cache 140 and decoder 150. Cache 140 is used to cache data and/or control signals (such as instructions) from, for example, main memory 104. Decoder 150 is used for decoding instructions received by processor 110 into control signals and/or microcode entry points. In response to these control signals and/or microcode entry points, execution unit 120 performs the appropriate operations. Decoder 150 may be implemented using any number of different mechanisms (e.g., a look-up table, a hardware implementation, a PLA, etc.).

FIG. 5a additionally shows a data storage device 108, (e.g., a magnetic disk, optical disk, and/or other machine readable media) can be coupled to computer system 100. In addition, the data storage device 108 is shown including code 195 for execution by the processor 110. The code 195 can be written to cause the processor 110 to perform transformations with the intra-add/subtract instruction(s) for any number of purposes (e.g., motion video compression/decompression, image filtering, audio signal compression, filtering or synthesis, modulation/demodulation, etc.). Computer system 100 can also be coupled via bus 102 to a display device 170, a user input device 172, a hard copy device 176, a sound recording and/or playback device 178, a video digitizing device 180, and/or a communications device 190 (e.g., a serial communications chip, a wireless interface, an ethernet chip or a modem, which provides communications with an external device or network).

Figure 5B:
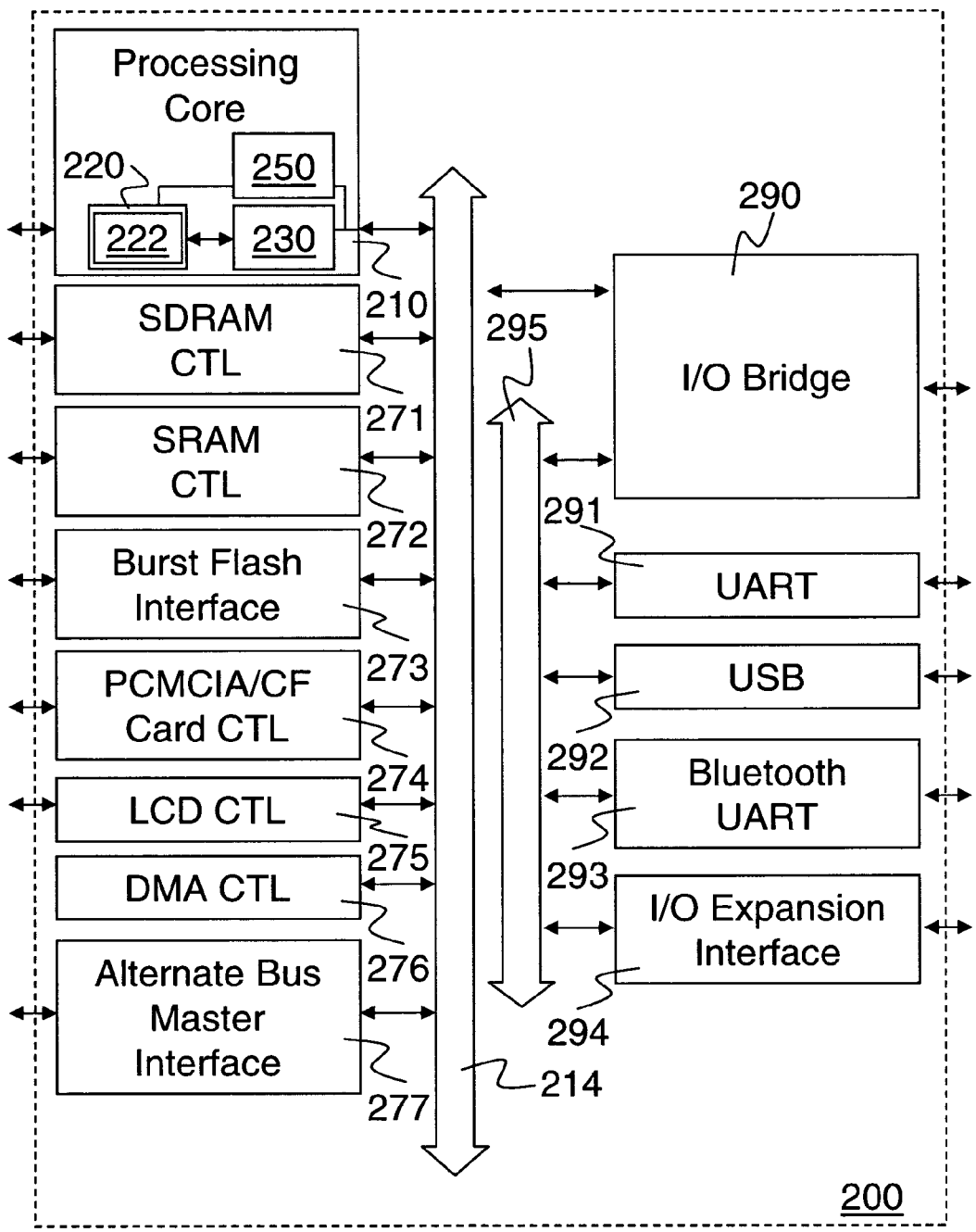
FIG. 5b illustrates another example of a computer system in accordance with an alternative embodiment of the invention.

FIG. 5b illustrates an alternative embodiment of a data processing system 200 which implements the principles of the present invention. One embodiment of data processing system 200 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 200 comprises a processing core 210 capable of performing SIMD operations including multiplications and horizontal additions and/or subtractions. For one embodiment, processing core 210 represents a processing unit of any type of architecture, including but not limited to a CISC, a RISC or a VLIW type architecture. Processing core 210 may also be suitable for manufacture in one or more process technologies and by being represented on a machine readable media in sufficient detail, may be suitable to facilitate said manufacture.

Processing core 210 comprises an execution unit 220, a set of register file(s) 230, and a decoder 250. Processing core 210 also includes additional circuitry (not shown) which is not necessary to the understanding of the present invention.

Execution unit 220 is used for executing instructions received by processing core 210. In addition to recognizing typical processor instructions, execution unit 220 recognizes instructions in packed instruction set 222 for performing operations on packed data formats. Packed instruction set 222 includes instructions for supporting intra-add/subtract operations, multiply operations, and may also include other packed instructions.

Execution unit 220 is coupled to register file 230 by an internal bus. Register file 230 represents a storage area on processing core 210 for storing information, including data. As previously mentioned, it is understood that the storage area used for storing the packed data is not critical. Execution unit 220 is coupled to decoder 250. Decoder 250 is used for decoding instructions received by processing core 210 into control signals and/or microcode entry points. In response to these control signals and/or microcode entry points, execution unit 220 performs the appropriate operations.

Processing core 210 is coupled with bus 214 for communicating with various other system devices, which may include but are not limited to, for example, synchronous dynamic random access memory (SDRAM) control 271, static random access memory (SRAM) control 272, burst flash memory interface 273, personal computer memory card international association (PCMCIA)/compact flash (CF) card control 274, liquid crystal display (LCD) control 275, direct memory access (DMA) controller 276, and alternative bus master interface 277.

In one embodiment, data processing system 200 may also comprise an I/O bridge 290 for communicating with various I/O devices via an I/O bus 295. Such I/O devices may include but are not limited to, for example, universal asynchronous receiver/transmitter (UART) 291, universal serial bus (USB) 292, Bluetooth wireless UART 293 and I/O expansion interface 294.

One embodiment of data processing system 200 provides for mobile, network and/or wireless communications and a processing core 210 capable of performing SIMD operations including intra-addition and/or subtraction. Processing core 210 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 5C:
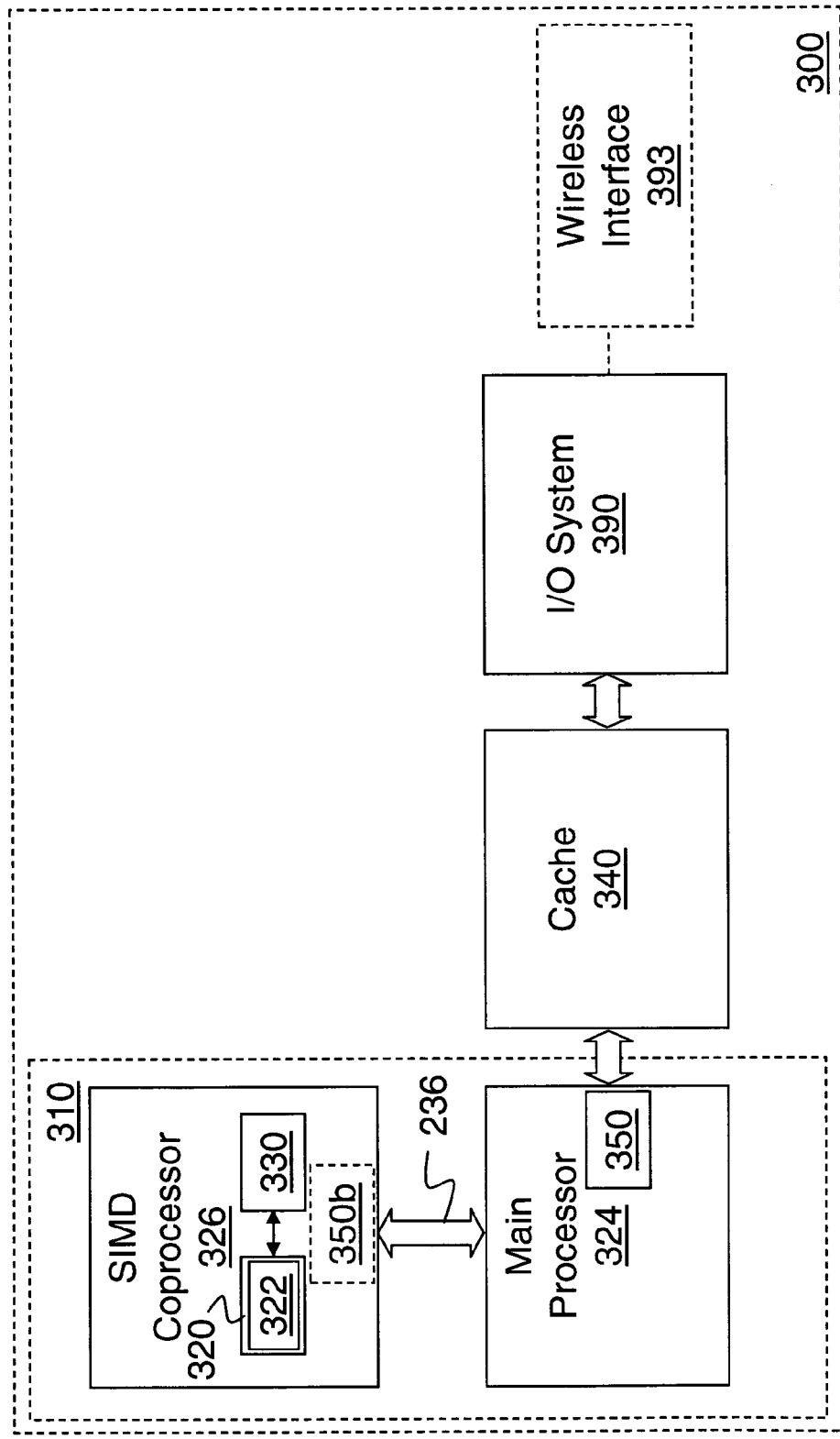
FIG. 5c illustrates another example of a computer system in accordance with an alternative embodiment of the invention.

FIG. 5c illustrates alternative embodiments of a data processing system capable of performing SIMD intra-addition/subtraction operations. In accordance with one alternative embodiment, data processing system 300 may include a main processor 324, a SIMD coprocessor 326, a cache memory 340 and an input/output system 390. The input/output system 390 may optionally be coupled to a wireless interface 393. SIMD coprocessor 326 is capable of performing SIMD operations including multiplications and horizontal additions and/or subtractions. Processing core 310 may be suitable for manufacture in one or more process technologies and by being represented on a machine readable media in sufficient detail, may be suitable to facilitate the manufacture of all or part of data processing system 300 including processing core 310.

For one embodiment, SIMD coprocessor 326 comprises an execution unit 320 and a set of register file(s) 330. One embodiment of main processor 324 comprises a decoder 350 to recognize instructions of instruction set 322 including SIMD multiply instructions and horizontal or intra-add/subtract instructions for execution by execution unit 320. For alternative embodiments, SIMD coprocessor 326 also comprises at least part of decoder 350b to decode instructions of instruction set 322. Processing core 310 also includes additional circuitry (not shown) which is not necessary to the understanding of the present invention.

In operation, the main processor 324 executes a stream of data processing instructions that control data processing operations of a general type including interactions with the cache memory 340, and the input/output system 390. Embedded within the stream of data processing instructions are SIMD coprocessor instructions. The decoder 350 of main processor 324 recognizes these SIMD coprocessor instructions as being of a type that should be executed by an attached SMD coprocessor 326. Accordingly, the main processor 324 issues these SIMD coprocessor instructions (or control signals representing SIMD coprocessor instructions) on the coprocessor bus 236 where from they are received by any attached SIMD coprocessors. In this case, the SIMD coprocessor 326 will accept and execute any received SIMD coprocessor instructions intended for it.

Data may be received via wireless interface 393 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames.

For one embodiment of processing core 310, main processor 324 and a SIMD coprocessor 326 are integrated into a single processing core 310 comprising an execution unit 320, a set of register file(s) 330, and a decoder 350 to recognize instructions of instruction set 322 including SIMD multiply instructions and horizontal or intra-add/subtract instructions for execution by execution unit 320.

Operation Encoding Formats

Turning next to FIG. 6a, in some alternative embodiments, 64 bit single instruction multiple data (SIMD) arithmetic operations may be performed through a coprocessor data processing (CDP) instruction. Operation encoding (opcode) format 401 depicts one such CDP instruction having CDP opcode fields 411 and 418. The type of CDP instruction, for alternative embodiments of horizontal or intra-add/subtract operations, may be encoded by one or more of fields 412, 413, 416 and 417. Up to three operand locations per instruction may be identified, including up to two source operand identifiers 402 and 403 and one destination operand identifier 405. One embodiment of the coprocessor can operate on 8, 16, 32, and 64 bit values. For one embodiment, the intra-addition/subtraction is performed on fixed-point or integer data values. For alternative embodiments, intra-addition/subtraction may be performed on floating-point data values. In some embodiments, the horizontal or intra-add/subtract instructions may be executed conditionally, using condition field 410. For some horizontal or intra-add/subtract instructions source data sizes may be encoded by field 412.

In some embodiments of the horizontal or intra-add/subtract instructions, Zero (Z), negative (N), carry (C), and overflow (V) detection can be done on SIMD fields. Also, signed saturation and/or unsigned saturation to the SIMD field width may be performed for some embodiments of intra-add/subtract operations. In some embodiments of the horizontal or intra-add/subtract instructions in which saturation is enabled, saturation detection may also be done on SIMD fields. For some instructions, the type of saturation may be encoded by field 413. For other instructions, the type of saturation may be fixed.

FIG. 6b is a depiction of an alternative operation encoding (opcode) format 501, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. The type of intra-add/subtract operation, may be encoded by one or more of fields 512 and 514. Up to two operand locations per instruction may be identified, including up to two source operand identifiers 502 and 503. For one embodiment of the intra-add/subtract instruction, destination operand identifier 505 is the same as source operand identifier 502. For an alternative embodiment, destination operand identifier 505 is the same as source operand identifier 503. Therefore, for embodiments of the intra-add/subtract operations, one of the source operands identified by source operand identifiers 502 and 503 is overwritten by the results of the intra-add/subtract operations. For one embodiment of the intra-add/subtract instruction, operand identifiers 502 and 503 may be used to identify 64-bit source and destination operands.

FIG. 6c is a depiction of another alternative operation encoding (opcode) format 601, having forty or more bits. Opcode format 601 corresponds with opcode format 501 and comprises an optional prefix byte 610. The type of intra-add/subtract operation, may be encoded by one or more of fields 610, 612 and 614. Up to two operand locations per instruction may be identified by source operand identifiers 602 and 603 and by prefix byte 610. For example, in one embodiment of the intra-add instruction, field 612 may be set to a hexadecimal value of 0F38 and field 614 may be set to a hexadecimal value of 01 to indicate that data associated with source operand identifiers 602 and 603 are to be treated as signed packed words and result data associated with destination operand identifier 605 are to be treated as signed packed words. For an alternative embodiment of the intra-add instruction, field 614 may be set to a hexadecimal value of 03 to indicate that result data associated with destination operand identifier 605 are to be saturated to signed word values. For another alternative embodiment of the intra-add instruction, field 614 may be set to a hexadecimal value of 02 to indicate that data associated with source operand identifiers 602 and 603 are to be treated as signed packed doublewords and result data associated with destination operand identifier 605 are to be treated as signed packed doublewords. For one embodiment of the intra-subtract instruction, field 614 may be set to a hexadecimal value of 05 to indicate that data associated with source operand identifiers 602 and 603 are to be treated as signed packed words and result data associated with destination operand identifier 605 are to be treated as signed packed words. For an alternative embodiment of the intra-subtract instruction, field 614 may be set to a hexadecimal value of 07 to indicate that result data associated with destination operand identifier 605 are to be saturated to signed word values. For another alternative embodiment of the intra-subtract instruction, field 614 may be set to a hexadecimal value of 06 to indicate that data associated with source operand identifiers 602 and 603 are to be treated as signed packed doublewords and result data associated with destination operand identifier 605 are to be treated as signed packed doublewords. For one embodiment of the intra-add/subtract instruction, prefix byte 610 may be used to identify 128-bit source and destination operands. For example, in one embodiment of the intra-add/subtract instruction, field 610 may be set to a hexadecimal value of 66 to indicate that 128 bits of data are associated with source operand identifiers 602 and 603 and 128 bits of result data are associated with destination operand identifier 605. For one embodiment of the intra-add/subtract instruction, destination operand identifier 605 is the same as source operand identifier 602. For an alternative embodiment, destination operand identifier 605 is the same as source operand identifier 603. Therefore, for embodiments of the intra-add/subtract operations, one of the source operands identified by source operand identifiers 602 and 603 is overwritten by the results of the intra-add/subtract operations.

Opcode formats 501 and 601 allow register to register, memory to register, register by memory, register by register, register by immediate, register to memory addressing specified in part by MOD fields 516 and 616 and by optional scale-index-base and displacement bytes.

Data and Storage Formats

Figure 7A:
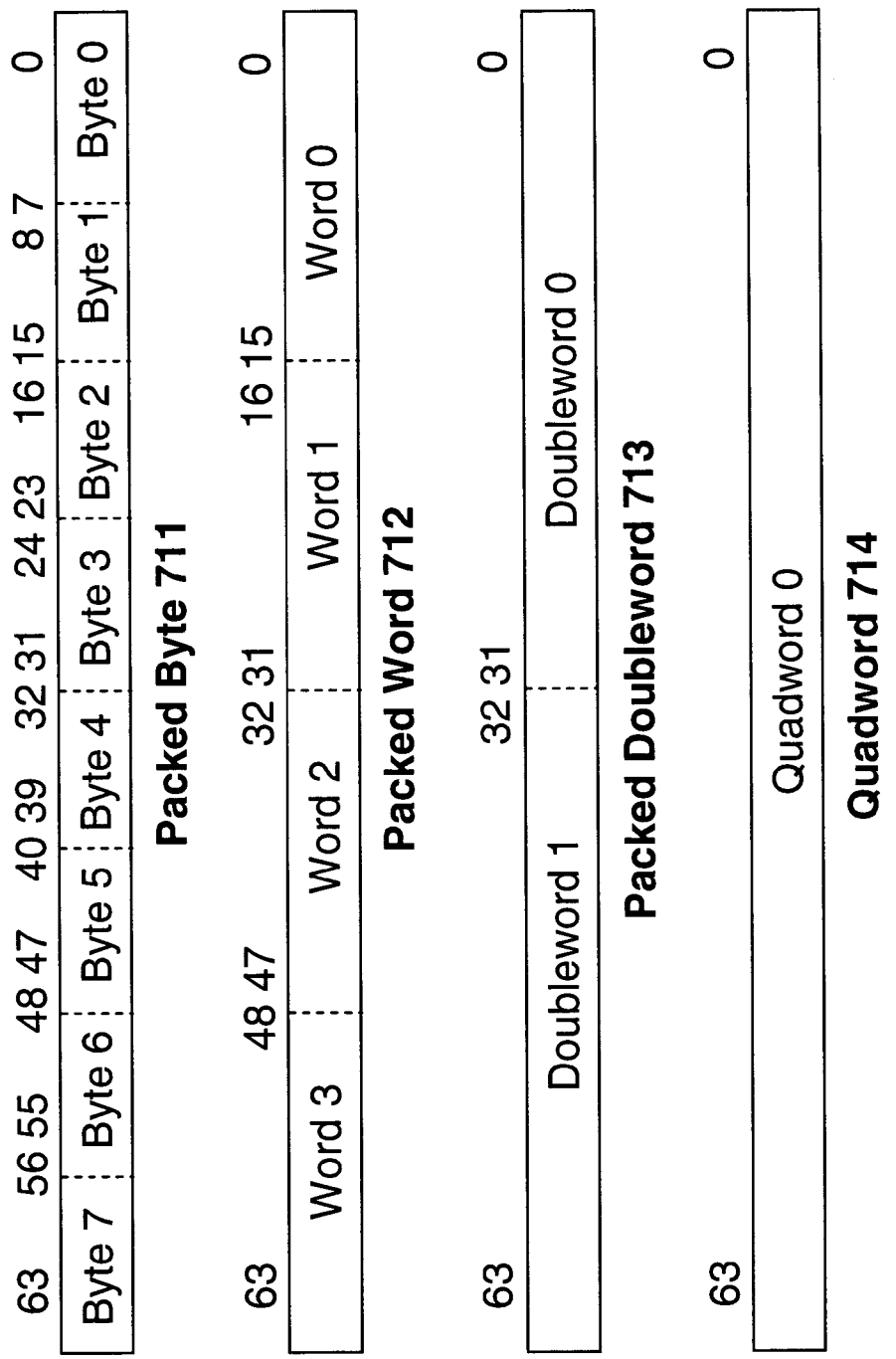
FIG. 7a illustrates packed data-types in accordance with one embodiment of the invention.

FIG. 7a illustrates alternative in-register fixed-point data storage formats. Each packed data includes more than one independent data element. Three packed data formats are illustrated; packed byte 711, packed word 712 and packed doubleword 713 together with quadword 714. One embodiment of packed byte 711 is sixty-four bits long containing eight data elements. Each data element is one byte long. One alternative embodiment of a packed byte format (not shown) is one hundred twenty-eight bits long containing sixteen byte data elements. Generally, a data element is an individual piece of data that is stored in a single register (or memory location) with other data elements of the same length. In one embodiment of the present invention, the number of data elements stored in a register is sixty-four bits divided by the length in bits of a data element. In an alternative embodiment of the present invention, the number of data elements stored in a register is one hundred twenty-eight bits divided by the length in bits of a data element.

One embodiment of packed word 712 is sixty-four bits long and contains four half word data elements. Each word data element in this embodiment contains sixteen bits of information.

One embodiment of packed doubleword 713 is sixty-four bits long and contains two doubleword data elements. Each doubleword data element in this embodiment contains thirty-two bits of information.

FIG. 7b illustrates alternative in-register data storage formats. Each packed data includes more than one independent data element. Three packed data formats are illustrated; packed half 721, packed single 722 and packed double 723. One embodiment of packed half 721, packed single 722 and packed double 723 contain fixed-point data elements. For an alternative embodiment one or more of packed half 721, packed single 722 and packed double 723 may contain floating-point data elements. One alternative embodiment of packed half 721 is one hundred twenty-eight bits long containing eight 16-bit data elements.

One embodiment of packed single 722 is one hundred twenty-eight bits long and contains four 32-bit data elements.

One embodiment of packed double 723 is one hundred twenty-eight bits long and contains two 64-bit data elements.

It will be appreciated that such packed data formats may be further extended to other register lengths, for example, to 96-bits, 160-bits, 192-bits, 224-bits, 256-bits or more.

Description of Saturation

As mentioned previously, some opcode embodiments may indicate whether intra-addition/subtraction operations optionally saturate. Where the result of an operation, with saturate enabled, overflows or underflows the range of the data, the result will be clamped. Clamping means setting the result to a maximum or minimum value should a result exceed the rangers maximum or minimum value. In the case of underflow, saturation clamps the result to the lowest value in the range and in the case of overflow, to the highest value. The allowable range for each data format of one embodiment is shown in Table 2.

TABLE 2

| Data Format | Minimum Value | Maximum Value |
| --- | --- | --- |
| Unsigned Byte | 0 | 255 |
| Signed Byte | −128 | 127 |
| Unsigned word | 0 | 65535 |
| Signed word | −32768 | 32767 |
| Unsigned Doubleword | 0 | $2^{32}$-1 |
| Signed Doubleword | $-2^{31}$ | $2^{31}$-1 |
| Unsigned Quadword | 0 | $2^{64}$-1 |
| Signed Quadword | $-2^{63}$ | $2^{63}$-1 |

Therefore, using the unsigned byte data format, if an operation's result=258 and saturation was enabled, then the result would be clamped to 255 before being stored into the operation's destination register. Similarly, if an operation's result=−32999 and a signed word data format with saturation enabled, then the result would be clamped to −32768 before being stored into the operation's destination register.

With no saturation, only the lower bits of the result are presented. With unsigned saturation, the bits from zero to the maximum unsigned value may be presented. With signed saturation, bits from the maximum positive to the maximum negative values are presented.

Intra-Add/Subtract Operation(s)

In one embodiment of the invention, the SRC1 register contains packed data (Source1), the SRC2 register contains packed data (Source2) and the DEST register will contain the result (Result) of performing the horizontal add instruction on Source1 and Source2. In the first step of the horizontal add/subtract instruction, one or more pairs of data elements from Source1 are summed/subtracted together. Similarly, one or more pairs of data elements from Source2 are summed/subtracted together. The results of the instruction are then stored in the DEST register.

Figure 8A:
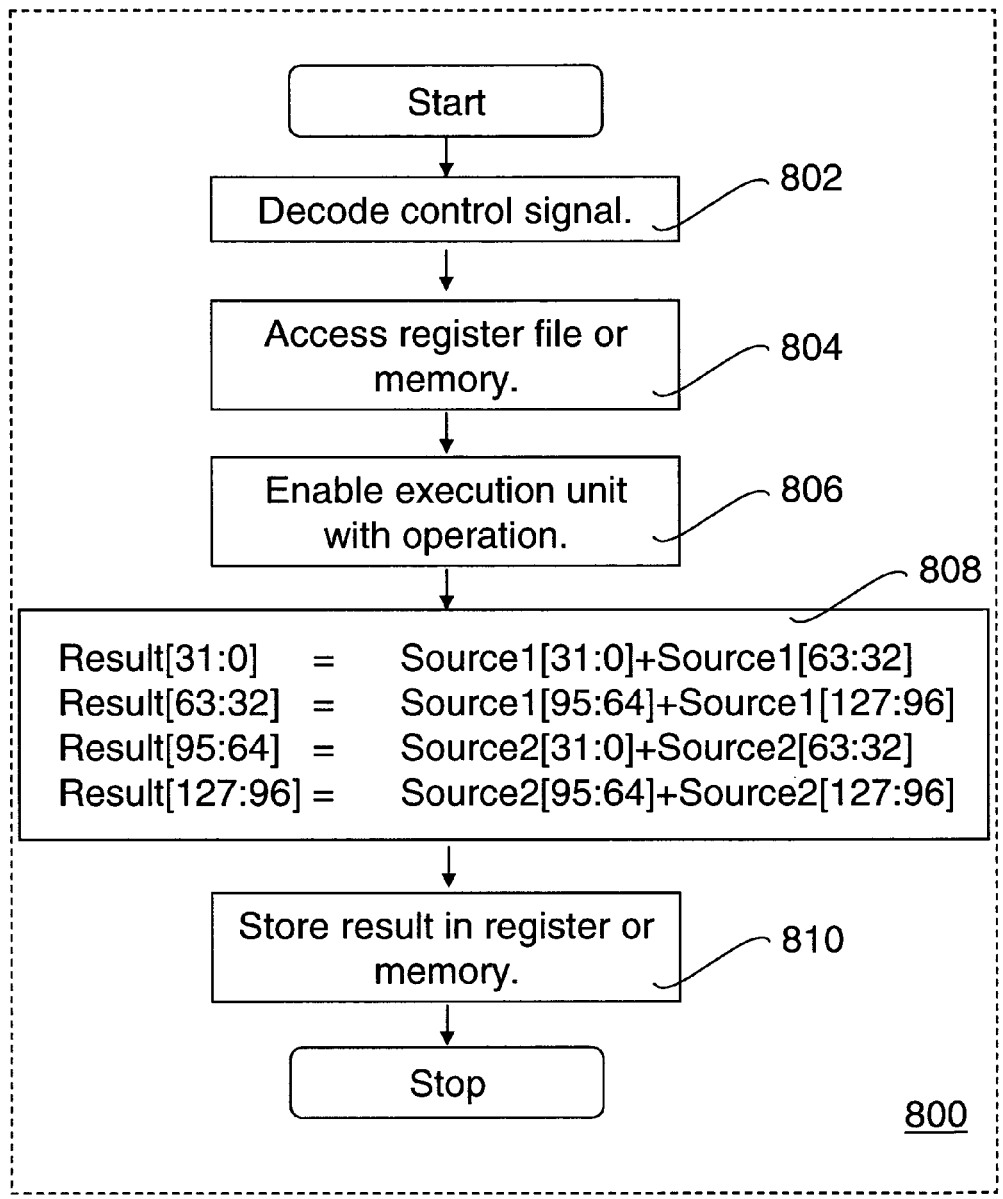

FIG. 8a is a flow diagram illustrating one embodiment of a process 800 for performing the intra-add operation of FIG. 3a. Process 800 and other processes herein disclosed are performed by processing blocks that may comprise dedicated hardware or software or firmware operation codes executable by general purpose machines or by special purpose machines or by a combination of both.

Process 800 begins from a start state and proceeds to processing block 802 where a control signal is decoded. In particular, the control signal identifies an operation code of a horizontal add or intra-add instruction. The process 800 then advances to processing block 804, where the registers in a register file or a memory are accessed at locations specified by the SRC1 and SRC2 addresses. The register file or memory provides an execution unit with the packed data (Source1) stored in at the SRC1 address, and the packed data (Source2) stored at the SRC2 address.

Process 800 proceeds to processing block 806, where the execution unit is enabled to perform the intra-add operation. Next, process 800 advances to processing block 808, where the intra-add operation of FIG. 3a is performed. Source1 bits thirty-one through zero are added to Source1 bits sixty-three through thirty-two, generating a first 32-bit result (Result[31:0]). Source1 bits ninety-five through sixty-four are added to Source1 bits one hundred-and-twenty-seven through ninety-six, generating a second 32-bit result (Result[63:32]). Source2 bits thirty-one through zero are added to Source2 bits sixty-three through thirty-two, generating a third 32-bit result (Result[95:64]). Source2 bits ninety-five through sixty-four are added to Source1 bits one hundred-and-twenty-seven through ninety-six, generating a fourth 32-bit result (Result [127:96]).

The process 800 advances to processing block 810, where the results of the intra-add instruction are stored in a register in a register file or a memory at the DEST address. The process 800 then terminates. Of course, the process of FIG. 8a can be easily altered to describe the horizontal addition of other packed data formats.

Figure 8B:
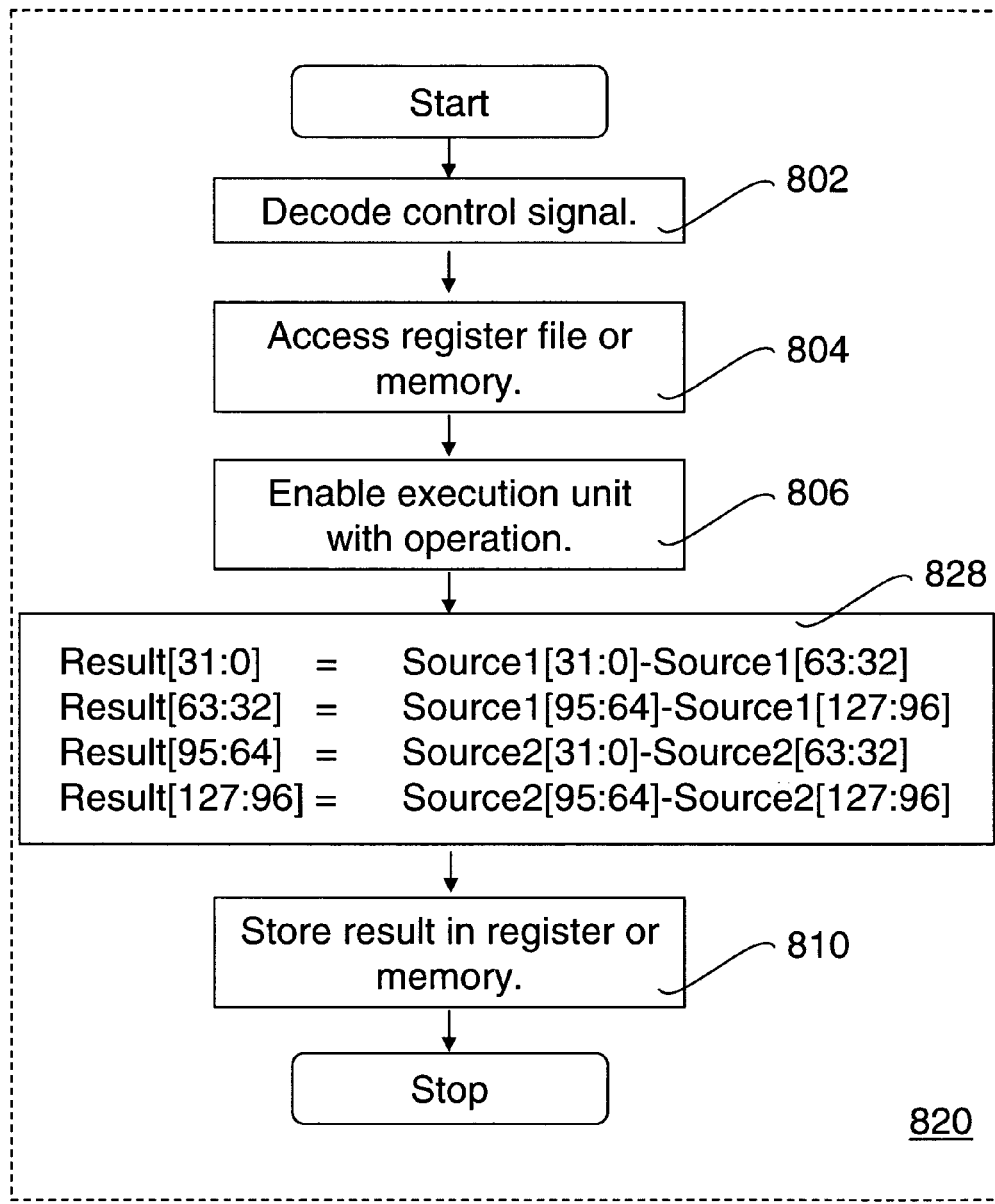
FIG. 8b is a flow diagram illustrating one embodiment of a process for performing the intra-subtract operation of FIG. 3b.

FIG. 8b is a flow diagram illustrating one embodiment of a process 820 for performing the intra-subtract operation of FIG. 3b. Process 820 begins from a start state and proceeds to processing block 802 where, again, a control signal is decoded. In particular, the control signal identifies an operation code of a horizontal subtract or intra-subtract instruction. The process 820 then advances to processing block 804, where the registers in a register file or a memory are accessed at locations specified by the SRC1 and SRC2 addresses. The register file or memory provides an execution unit with the packed data (Source1) stored in at the SRC1 address, and the packed data (Source2) stored at the SRC2 address.

Process 800 proceeds to processing block 806, where the execution unit, in accordance with the instruction decoded, is enabled to perform the intra-subtract operation. Next, process 800 advances to processing block 828, where the intra-subtract operation of FIG. 3b is performed. Source1 bits sixty-three through thirty-two are subtracted from Source1 bits thirty-one through zero, generating a first 32-bit result (Result [31:0]). Source1 bits one hundred-and-twenty-seven through ninety-six are subtracted from Source1 bits ninety-five through sixty-four, generating a second 32-bit result (Result [63:32]). Source2 bits sixty-three through thirty-two are subtracted from Source2 bits thirty-one through zero, generating a third 32-bit result (Result[95:64]). Source2 bits one hundred-and-twenty-seven through ninety-six are subtracted from Source2 bits ninety-five through sixty-four, generating a fourth 32-bit result (Result[127:96]).

The process 820 advances to processing block 810, where the results of the intra-subtract instruction are stored in a register in a register file or a memory at the DEST address. The process 820 then terminates.

Figure 8C:
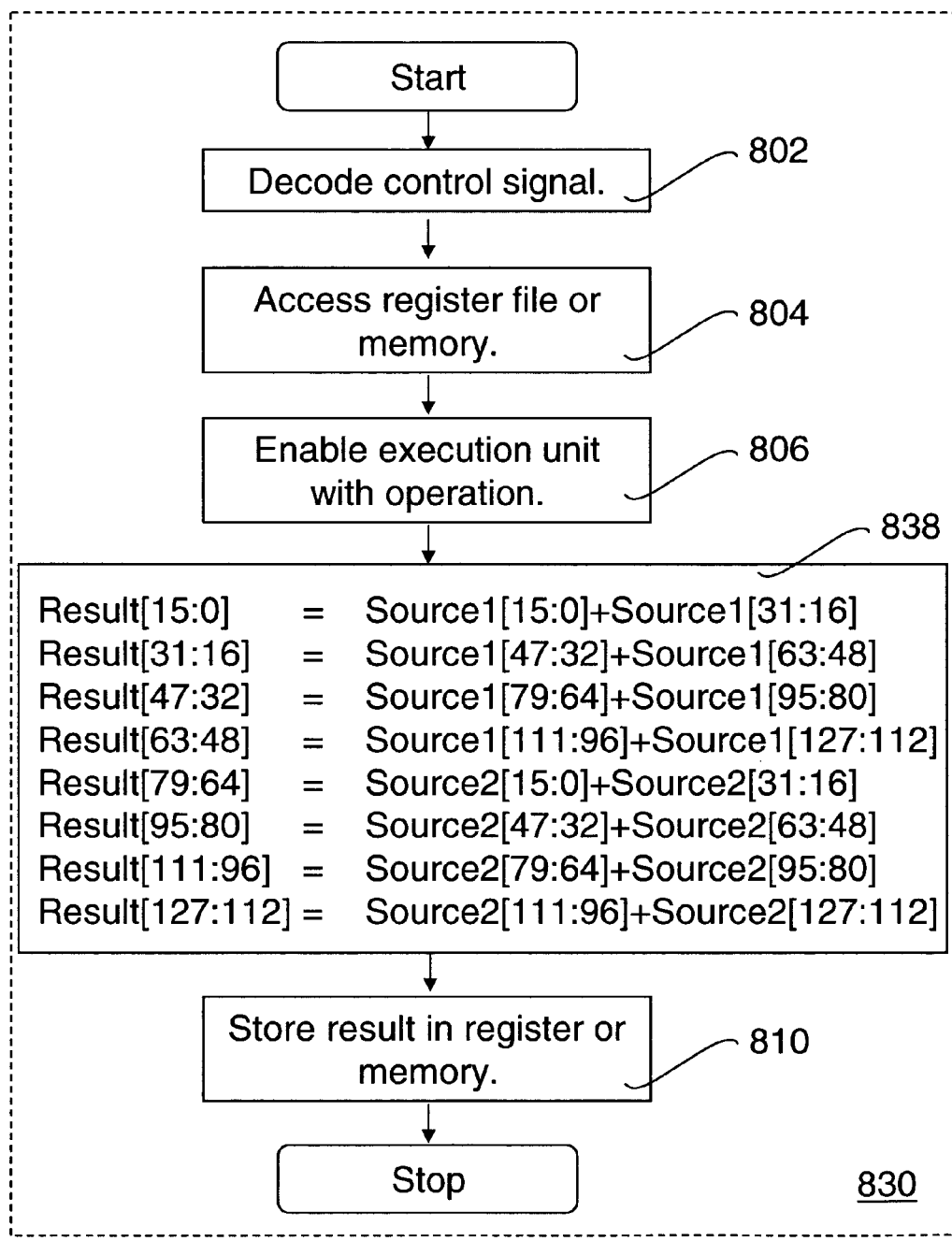
FIG. 8c is a flow diagram illustrating an alternative embodiment of a process for performing the intra-add operation.

FIG. 8c is a flow diagram illustrating an alternative embodiment of a process 830 for performing the intra-add operation. Process 830 begins from a start state and proceeds to processing block 802 where a control signal is decoded. In particular, the control signal identifies an operation code of an intra-add instruction. In processing block 804 the registers in a register file or a memory are accessed according to the SRC1 and SRC2 addresses. The register file or memory provides the execution unit with Source1 stored in at the SRC1 address, and Source2 stored at the SRC2 address.

In processing block 806, the execution unit is enabled to perform the intra-add operation. Next, in processing block 838, Source1 bits thirty-one through sixteen are added to Source1 bits fifteen through zero, generating a first 16-bit result (Result[15:0]). Source1 bits sixty-three through forty-eight are added to Source1 bits one forty-seven through thirty-two, generating a second 16-bit result (Result[31:16]). Source1 bits ninety-five through eighty are added to Source1 bits seventy-nine through sixty-four, generating a third 16-bit result (Result[47:32]). Source1 bits one hundred-and-twenty-seven through one hundred-and-twelve are added to Source1 bits one hundred-and-eleven through ninety-six, generating a fourth 16-bit result (Result[63:48]). Source2 bits thirty-one through sixteen are added to Source2 bits fifteen through zero, generating a fifth 16-bit result (Result[79:64]). Source2 bits sixty-three through forty-eight are added to Source2 bits one forty-seven through thirty-two, generating a sixth 16-bit result (Result[95:80]). Source2 bits ninety-five through eighty are added to Source2 bits seventy-nine through sixty-four, generating a seventh 16-bit result (Result[111:96]). Source2 bits one hundred-and-twenty-seven through one hundred-and-twelve are added to Source2 bits one hundred-and-eleven through ninety-six, generating an eighth 16-bit result (Result[127:112]).

The process 830 advances to processing block 810, where the results of the intra-add instruction are stored in a register in a register file or a memory at the DEST address. The process 830 then terminates.

Figure 8D:
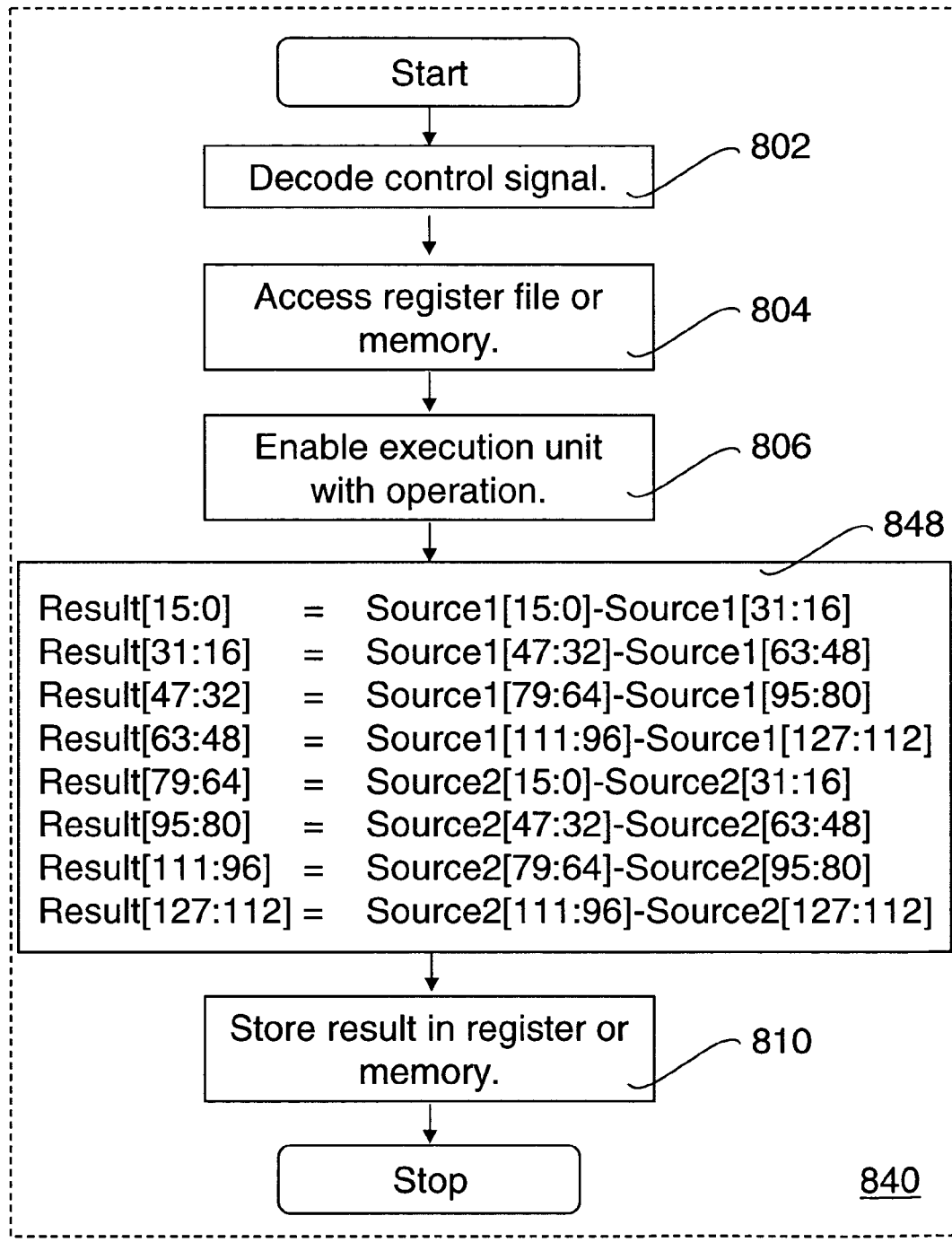
FIG. 8d is a flow diagram illustrating an alternative embodiment of a process for performing the intra-subtract operation.

FIG. 8d is a flow diagram illustrating an alternative embodiment of a process 840 for performing the intra-subtract operation. Process 840 begins from a start state and proceeds to processing block 802 where a control signal is decoded. In particular, the control signal identifies an operation code of an intra-subtract instruction. In processing block 804 the registers in a register file or a memory are accessed according to the SRC1 and SRC2 addresses. The register file or memory provides the execution unit with Source1 stored in at the SRC1 address, and Source2 stored at the SRC2 address.

In processing block 806, the execution unit is enabled to perform the intra-subtract operation. Next, in processing block 848, Source1 bits thirty-one through sixteen are subtracted from Source1 bits fifteen through zero, generating a first 16-bit result (Result[15:0]). Source1 bits sixty-three through forty-eight are subtracted from Source1 bits one forty-seven through thirty-two, generating a second 16-bit result (Result[31:16]). Source1 bits ninety-five through eighty are subtracted from Source1 bits seventy-nine through sixty-four, generating a third 16-bit result (Result[47:32]). Source1 bits one hundred-and-twenty-seven through one hundred-and-twelve are subtracted from Source1 bits one hundred-and-eleven through ninety-six, generating a fourth 16-bit result (Result[63:48]). Source2 bits thirty-one through sixteen are subtracted from Source2 bits fifteen through zero, generating a fifth 16-bit result (Result[79:64]). Source2 bits sixty-three through forty-eight are subtracted from Source2 bits one forty-seven through thirty-two, generating a sixth 16-bit result (Result[95:80]). Source2 bits ninety-five through eighty are subtracted from Source2 bits seventy-nine through sixty-four, generating a seventh 16-bit result (Result[111:96]). Source2 bits one hundred-and-twenty-seven through one hundred-and-twelve are subtracted from Source2 bits one hundred-and-eleven through ninety-six, generating an eighth 16-bit result (Result[127:112]).

The process 840 advances to processing block 810, where the results of the intra-add instruction are stored in a register in a register file or a memory at the DEST address. The process 840 then terminates.

Figure 8E:
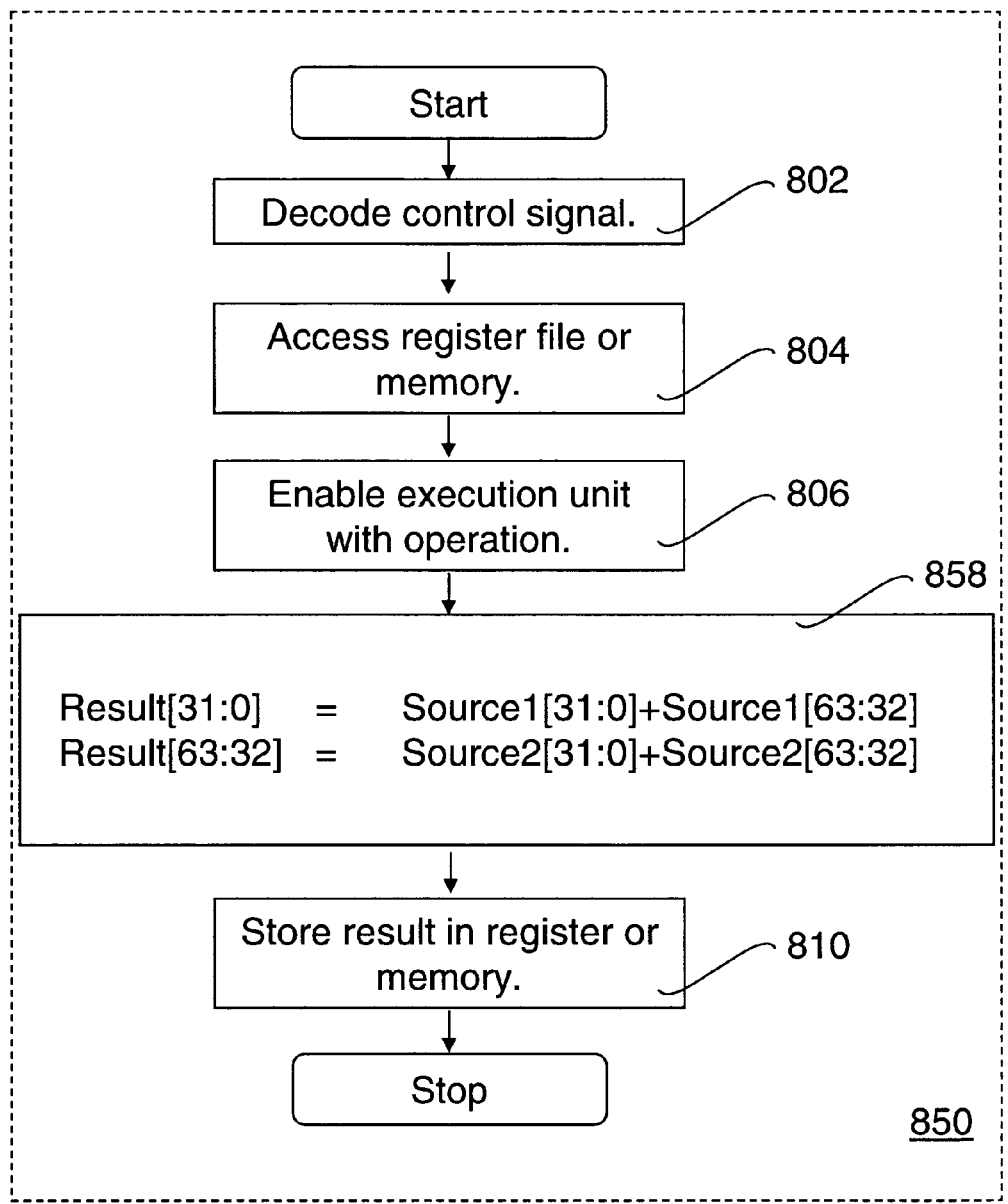
FIG. 8e is a flow diagram illustrating one alternative embodiment of a process for performing the intra-add operation of FIG. 3c.

FIG. 8e is a flow diagram illustrating one embodiment of a process 850 for performing the intra-add operation of FIG. 3c. Process 850 begins from a start state and proceeds to processing block 802 where a control signal that identifies an operation code of an intra-add instruction is decoded. The process 850 then advances to processing block 804, where the registers in a register file or a memory are accessed and the execution unit is supplied with the packed data (Source1) stored in at the SRC1 address, and the packed data (Source2) stored at the SRC2 address.

Process 850 proceeds to processing block 806, where the execution unit is enabled to perform the intra-add operation. Next, in processing block 858, the intra-add operation of FIG. 3c is performed. Source1 bits thirty-one through zero are added to Source1 bits sixty-three through thirty-two, generating a first 32-bit result (Result[31:0]). Source2 bits thirty-one through zero are added to Source2 bits sixty-three through thirty-two, generating a second 32-bit result (Result [63:32]).

The process 850 advances to processing block 810, where the results of the intra-add instruction are stored in a register in a register file or a memory at the DEST address. The process 850 then terminates.

Figure 8F:
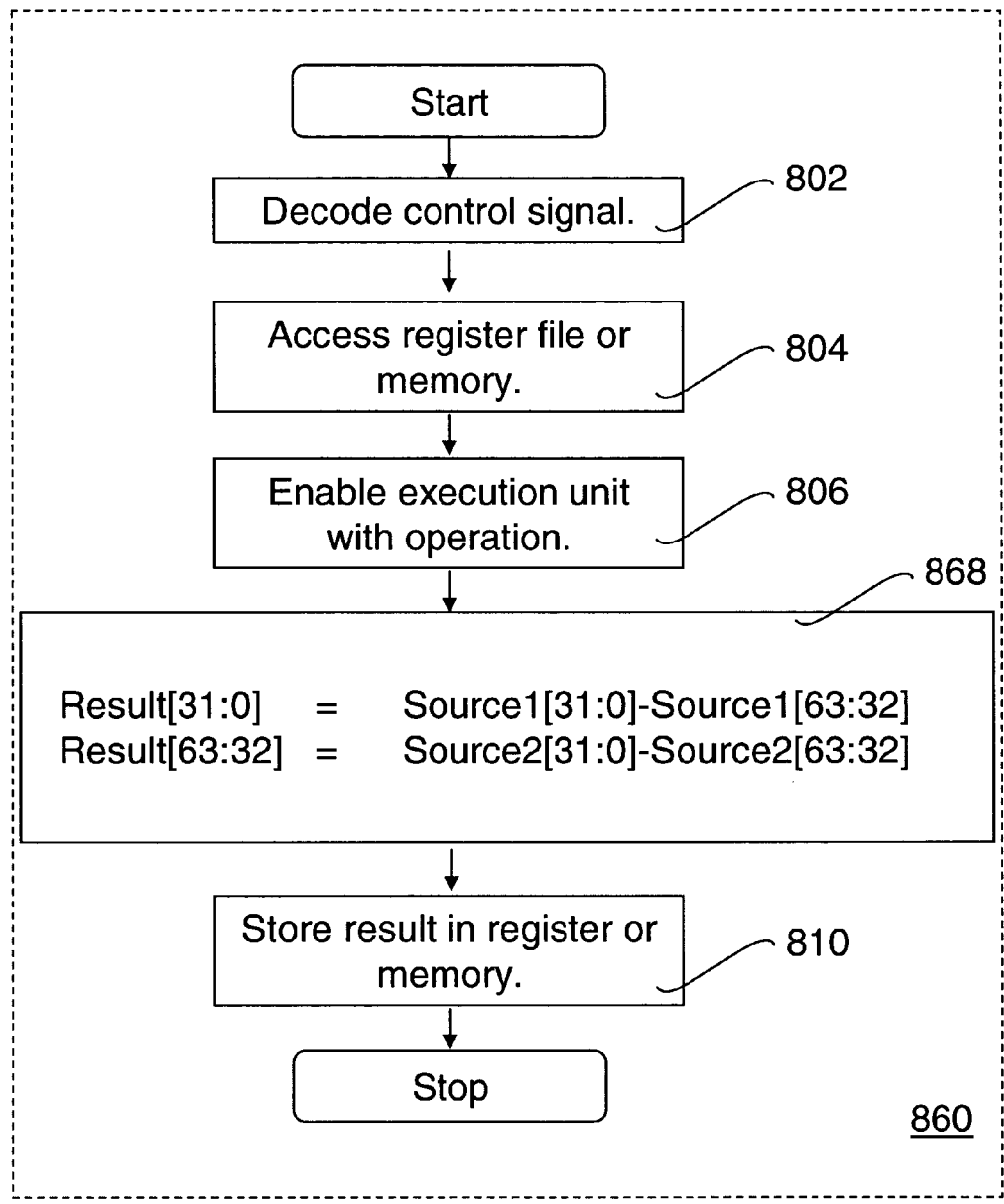
FIG. 8f is a flow diagram illustrating another alternative embodiment of a process for performing the intra-subtract operation.

FIG. 8f is a flow diagram illustrating another alternative embodiment of a process 860 for performing the intra-subtract operation. Process 860 begins from a start state and proceeds to processing block 802 where, a control signal that identifies an operation code of an intra-subtract instruction is decoded. The process 860 then advances to processing block 804, where the registers in a register file or a memory are accessed and the execution unit is supplied with the packed data (Source1) stored in at the SRC1 address, and the packed data (Source2) stored at the SRC2 address.

Process 860 proceeds to processing block 806, where the execution unit, in accordance with the instruction decoded, is enabled to perform the intra-subtract operation. Next, in processing block 868, Source1 bits sixty-three through thirty-two are subtracted from Source1 bits thirty-one through zero, generating a first 32-bit result (Result[31:0]). Source2 bits sixty-three through thirty-two are subtracted from Source2 bits thirty-one through zero, generating a second 32-bit result (Result[63:32]).

The process 860 advances to processing block 810, where the results of the intra-subtract instruction are stored in a register in a register file or a memory at the DEST address. The process 860 then terminates.

Figure 8G:
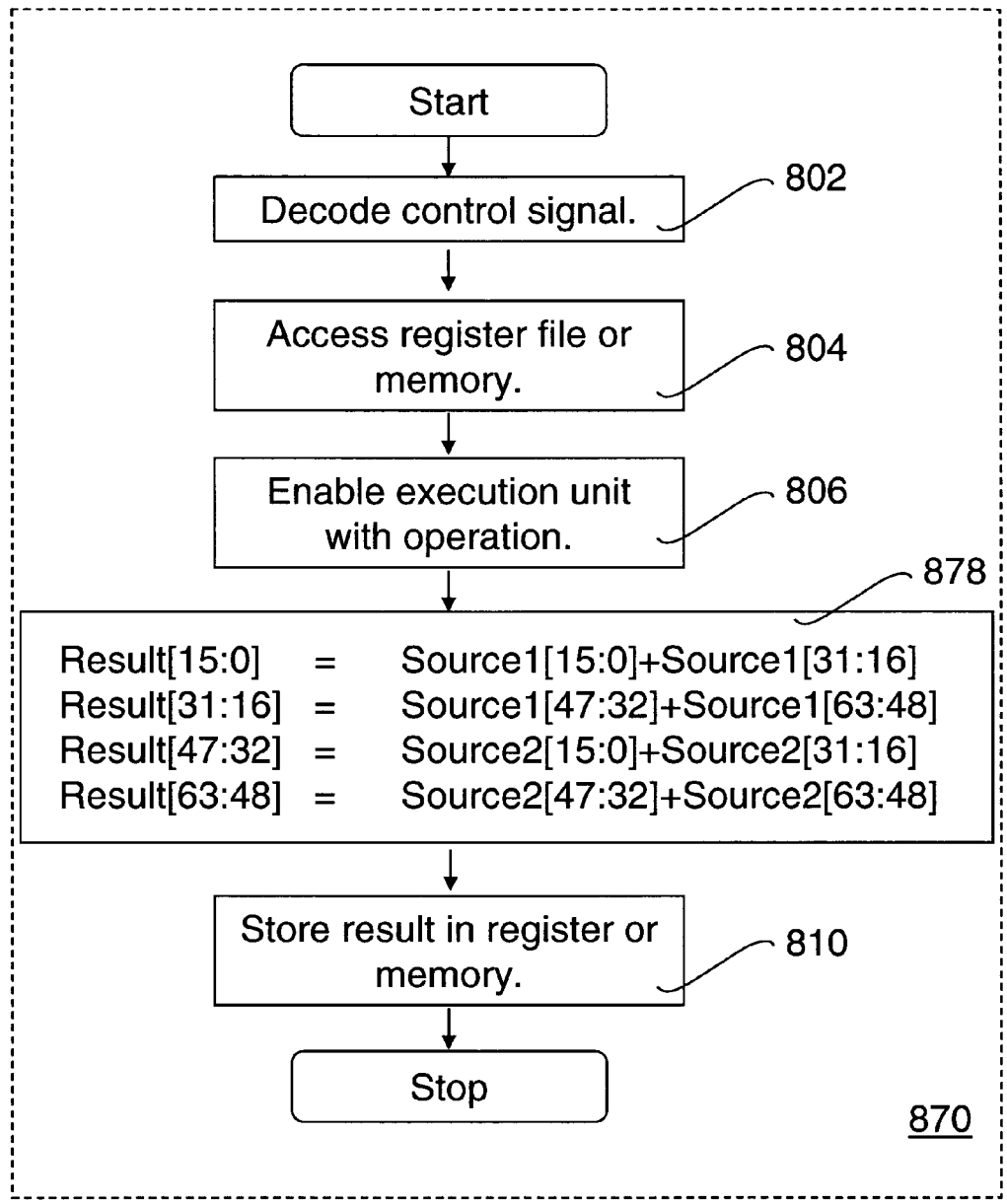

FIG. 8g is a flow diagram illustrating an alternative embodiment of a process 870 for performing the intra-add operation of FIG. 3a. Process 870 begins from a start state and proceeds to processing block 802 where a control signal that identifies an operation code of an intra-add instruction is decoded. The process 870 then advances to processing block 804, where the registers in a register file or a memory are accessed and the execution unit is supplied with the packed data (Source1) stored in at the SRC1 address, and the packed data (Source2) stored at the SRC2 address.

In processing block 806, the execution unit is enabled to perform the intra-add operation of FIG. 3a. Next, in processing block 878, Source1 bits thirty-one through sixteen are added to Source1 bits fifteen through zero, generating a first 16-bit result (Result[15:0]). Source1 bits sixty-three through forty-eight are added to Source1 bits one forty-seven through thirty-two, generating a second 16-bit result (Result[31:16]). Source2 bits thirty-one through sixteen are added to Source2 bits fifteen through zero, generating a third 16-bit result (Result[47:32]). Source2 bits sixty-three through forty-eight are added to Source2 bits one forty-seven through thirty-two, generating a fourth 16-bit result (Result[63 :48]).

The process 870 advances to processing block 810, where the results of the intra-add instruction are stored in a register in a register file or a memory at the DEST address. The process 870 then terminates.

Figure 8H:
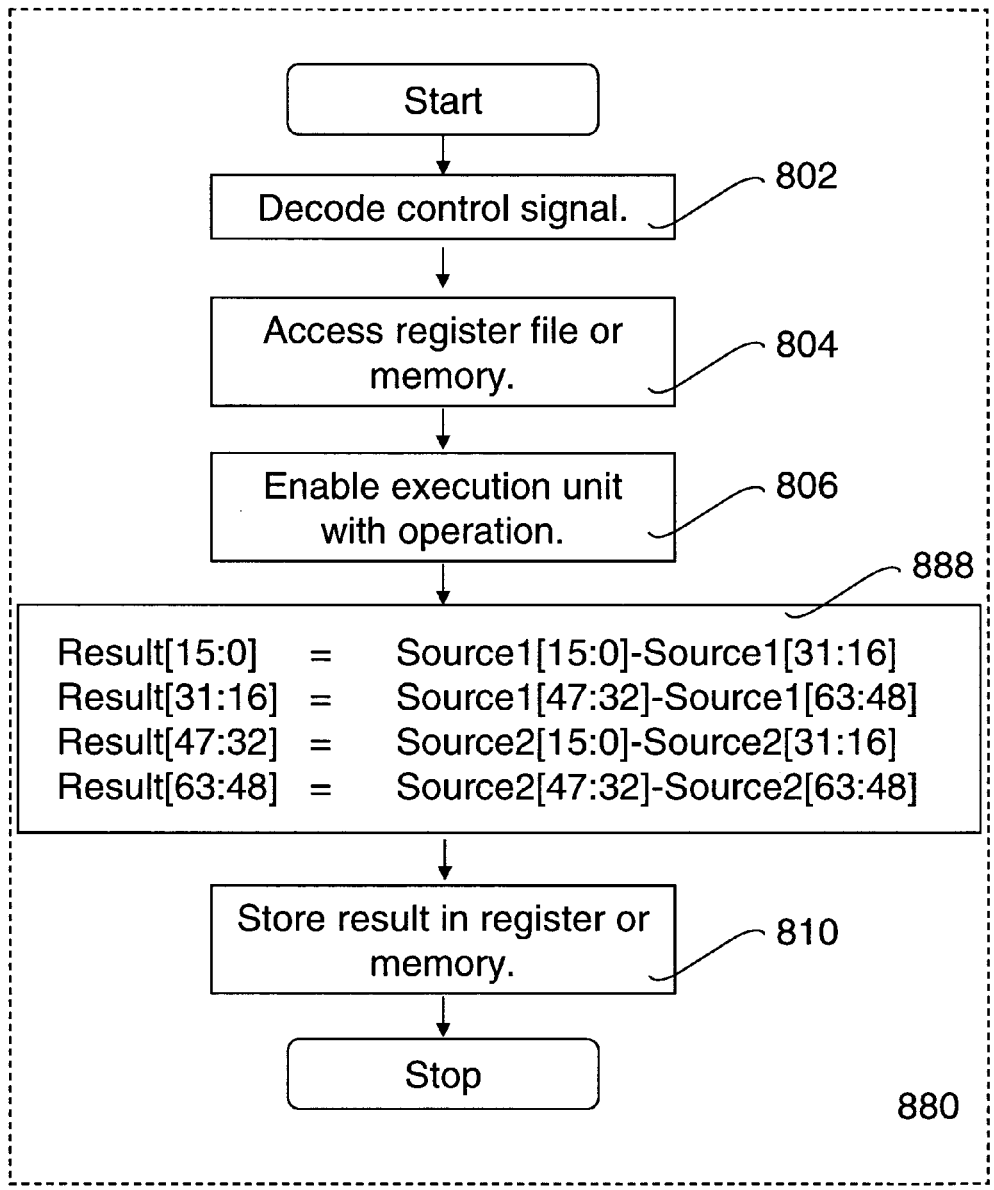
FIG. 8h is a flow diagram illustrating one alternative embodiment of a process for performing the intra-subtract operation of FIG. 3b.

FIG. 8h is a flow diagram illustrating an alternative embodiment of a process 880 for performing the intra-subtract operation of FIG. 3b. Process 880 begins from a start state and proceeds to processing block 802 where a control signal that identifies an operation code of an intra-subtract instruction is decoded. The process 880 then advances to processing block 804, where the registers in a register file or a memory are accessed and the execution unit is supplied with the packed data (Source1) stored in at the SRC1 address, and the packed data (Source2) stored at the SRC2 address.

In processing block 806, the execution unit is enabled to perform the intra-add operation of FIG. 3b. Next, in processing block 888, Source1 bits thirty-one through sixteen are subtracted from Source1 bits fifteen through zero, generating a first 16-bit result (Result[15:0]). Source1 bits sixty-three through forty-eight are subtracted from Source1 bits one forty-seven through thirty-two, generating a second 16-bit result (Result[31:16]). Source2 bits thirty-one through sixteen are subtracted from Source2 bits fifteen through zero, generating a third 16-bit result (Result[47:32]). Source2 bits sixty-three through forty-eight are subtracted from Source2 bits one forty-seven through thirty-two, generating a fourth 16-bit result (Result[63:48]).

The process 870 advances to processing block 810, where the results of the intra-add instruction are stored in a register in a register file or a memory at the DEST address. The process 870 then terminates. It will be appreciated that any of the processes of FIGS. 8a-8h may be performed with signed saturation, with unsigned saturation or without saturation.

Exemplary Intra-Add/Subtract Circuit(s)

In one embodiment, the intra-add/subtract instructions can execute on multiple data elements in the same number of clock cycles as an inter-add operation on unpacked data. To achieve execution in the same number of clock cycles, parallelism is used.

Figure 9A:
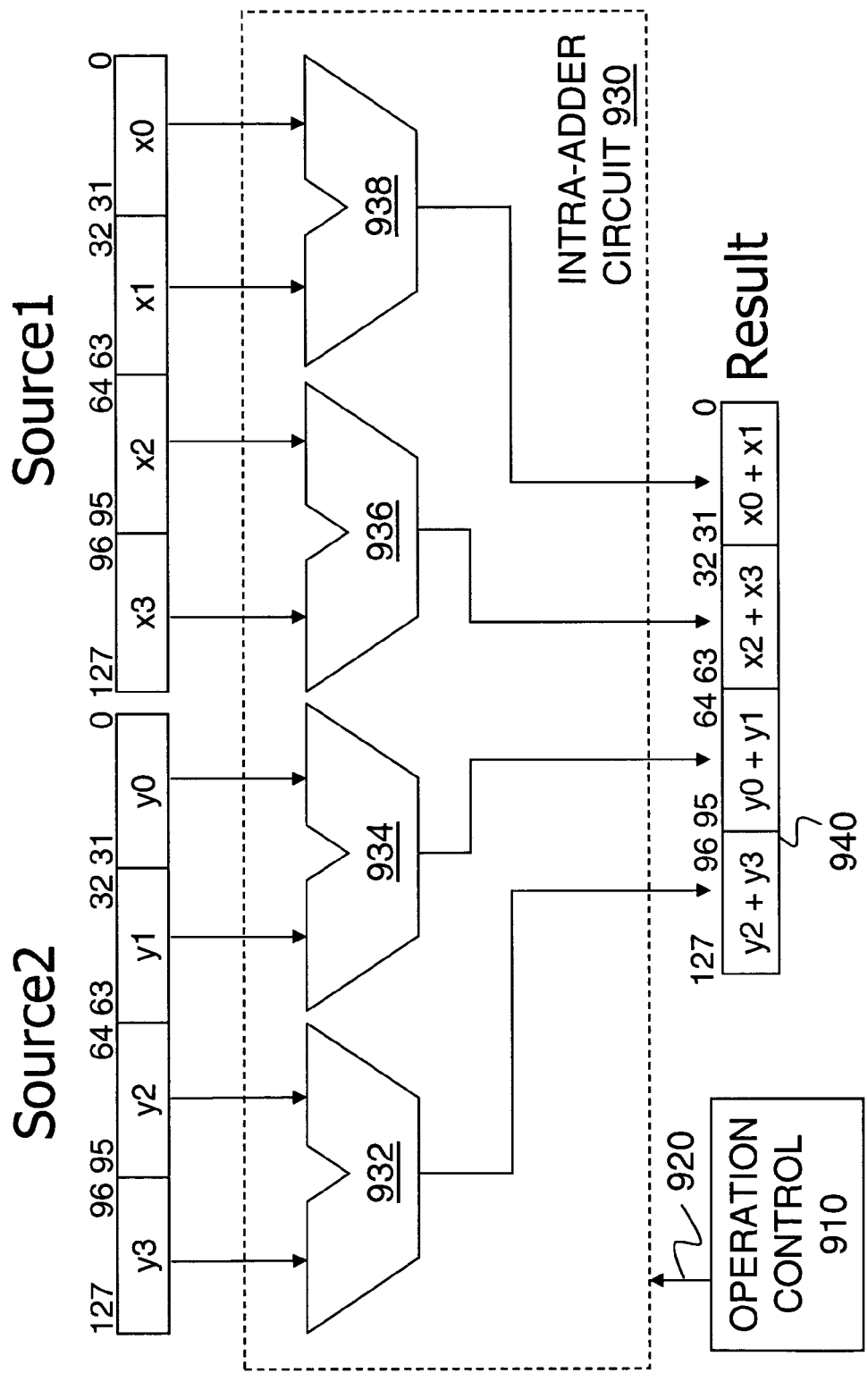
FIG. 9a illustrates one embodiment of a circuit for performing horizontal or intra-add/subtract operations.

FIG. 9a illustrates one embodiment of a circuit for performing horizontal or intra-add/subtract operations. Operation control 910 processes the control signal for the intra-add operations. Operation control 910 outputs signals via signal line(s) 920 to control intra-adder 930.

The intra-adder 930 receives inputs from Source1[127:0], Source2[127:0], and Enable 920. The intra-adder 930 includes four adder circuits 932, 934, 936 and 938. Adder 932 receives inputs from Source2[127:64], adder 934 receives inputs from Source2[63:0], adder 936 receives inputs from Source1[127:64], while adder 938 receives inputs from Source1[63:0]. When enabled, the adders 932, 934, 936 and 938 sum their respective inputs, and each generates a 32-bit output. The results of the addition by adder 932 (i.e., Result [127:96]), adder 934 (i.e., Result[95:64], by adder 936 (i.e., Result[63:32]), and by adder 938 (i.e., Result[31:0]) are combined into the 128-bit Result and communicated to the Result Register 940.

Figure 9B:
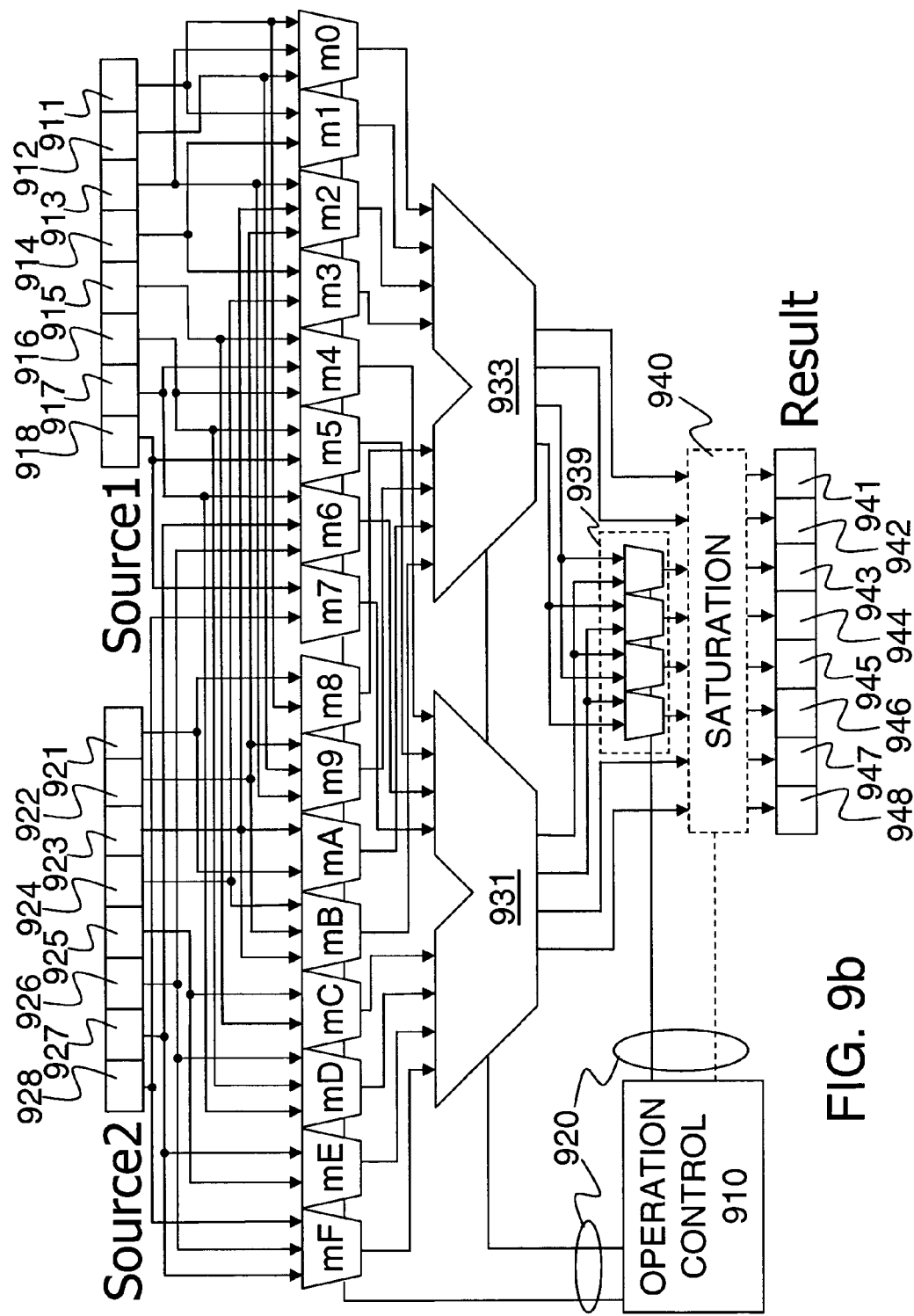
FIG. 9b illustrates an alternative embodiment of a circuit for performing horizontal or intra-add/subtract operations.

FIG. 9b illustrates an alternative embodiment of a circuit for performing horizontal or intra-add/subtract operations. Operation control 910 processes the control signal for the intra-add/subtract operations. Operation control 910 outputs signals via signal line(s) 920 to control adders 931 and 933, multiplexers m0-mF, multiplexers 939 and saturation circuitry 940. Through the use of multiplexers m0-mF, operand data elements from Source1 and Source2 may be aligned to positions at the inputs of adders 931 and 933 to facilitate horizontal or intra-addition/subtraction as well as to facilitate vertical or inter-addition/subtraction. Through the use of multiplexers 939, the results form adders 931 and 933 may be aligned to facilitate intra-addition/subtraction of different width operands, Source1 and Source2. It will be appreciated that various sizes of operand data elements and of operands Source1 and Source2 may be supported through such an approach.

For example, one embodiment of intra-add/subtract operations as illustrated in FIGS. 3a and 3b and as described in FIGS. 8g and 8h, respectively, uses 16-bit data elements 914-911 of Source1 and 924-921 of Source2. To accomplish such an operation through the use of adder 933, operation control 910 signals for the outputs of multiplexers m3-m0 to be elements 924, 922, 914 and 912 respectively. Operation control 910 signals for the outputs of multiplexers mB-m8 to be elements 923, 921, 913 and 911 respectively. In this way adder 933 can perform a 16-bit intra-addition/subtraction in substantially the same manner as a 16-bit inter-addition/subtraction, producing element 923 plus/minus element 924, element 921 plus/minus element 922, element 913 plus/minus element 914, and element 911 plus/minus element 912. Operation control 910 also signals for the multiplexers 939 to pass through results from the adders without realigning them and so the results may be optionally saturated and stored as elements 944-941 respectively.

An alternative embodiment of intra-add/subtract operations as illustrated in FIG. 3c and as described in FIGS. 8e and 8f, respectively, uses 32-bit data elements 914-913, and 912-911 of Source1 and 924-923, and 922-921 of Source2. To accomplish such an operation through the use of adder 933, operation control 910 signals for the outputs of multiplexers m3-m0 to be elements 924, 923, 914 and 913 respectively. Operation control 910 signals for the outputs of multiplexers mB-m8 to be elements 922, 921, 912 and 911 respectively. In this way adder 933 can perform a 32-bit intra-addition/subtraction in substantially the same manner as a 32-bit inter-addition/subtraction, producing element 922-921 plus/minus element 924-923, and element 912-911 plus/minus element 914-913. Once again operation control 910 signals for the multiplexers 939 to pass through results from the adders without realigning them and so the results may be optionally saturated and stored as two 32-bit elements 944-943 and 942-941 respectively.

Another alternative embodiment of intra-add/subtract operations as illustrated in FIGS. 3a and 3b and as described in FIGS. 8a and 8b, respectively, uses four 32-bit elements 918-917, 916-915, 914-913, and 912-911 of Source1 and 928-927, 926-925, 924-923, and 922-921 of Source2. To accomplish such an operation through the use of adders 931 and 933, operation control 910 signals for the outputs of multiplexers m7-m0 to be elements 928, 927, 918, 917, 924, 923, 914 and 913 respectively. Operation control 910 signals for the outputs of multiplexers mF-m8 to be elements 926, 925, 916, 915, 922, 921, 912 and 911 respectively. In this way adders 931 and 933 can perform 32-bit intra-additions/subtractions in substantially the same manner as 32-bit inter-additions/subtractions, producing element 926-925 plus/minus element 928-927, element 916-915 plus/minus element 918-917, element 922-921 plus/minus element 924-923, and element 912-911 plus/minus element 914-913. For the 128-bit operands, operation control 910 signals for the multiplexers 939 to realign the two middle results from the adders by swapping a result from adder 931 (bits 95-64) with a result from adder 933 (bits 63-32) to produce element 926-925 plus/minus element 928-927, element 922-921 plus/minus element 924-923, element 916-915 plus/minus element 918-917, and element 912-911 plus/minus element 914-913. These results may be optionally saturated and stored as four 32-bit elements 948-947 and 946-945 944-943 and 942-941 respectively.

It will be appreciated that multiplexers 939 may provide timing advantages by reducing some of the wiring delay associated with 128-bit operands and reducing multiplexer complexity before the adder. It will also be appreciated that techniques such as those illustrated by FIG. 9b may be modified in arrangement or detail without departing from the broader spirit of the invention.

Another embodiment of intra-add/subtract operations as described in FIGS. 8c and 8d, respectively, uses 16-bit data elements 918-911 of Source1 and 928-921 of Source2. To accomplish such an operation through the use of adders 931 and 933, operation control 910 signals for the outputs of multiplexers m7-m0 to be elements 928, 926, 918, 916, 924, 922, 914 and 912 respectively. Operation control 910 signals for the outputs of multiplexers mF-m8 to be elements 927, 925, 917, 915, 923, 921, 913 and 911 respectively. In this way adders 931 and 933 can perform 16-bit intra-additions/subtractions in substantially the same manner as 16-bit inter-additions/subtractions, producing element 927 plus/minus element 928, element 925 plus/minus element 926, element 917 plus/minus element 918, element 915 plus/minus element 916, element 923 plus/minus element 924, element 921 plus/minus element 922, element 913 plus/minus element 914, and element 911 plus/minus element 912. For the 128-bit operands, operation control 910 signals for the multiplexers 939 to realign the four middle results from the adders by swapping two results from adder 931 (bits 95-64) with two results from adder 933 (bits 63-32) to produce element 927 plus/minus element 928, element 925 plus/minus element 926, 923 plus/minus element 924, element 921 plus/minus element 922, element 917 plus/minus element 918, element 915 plus/minus element 916, element 913 plus/minus element 914, and element 911 plus/minus element 912. These results may be optionally saturated and stored as 16-bit elements 948-941 respectively.

For performing vertical or inter-addition/subtraction operations, operation control 910 signals for the outputs of multiplexers m7-m0 to be elements 918-911 respectively and for the outputs of multiplexers mF-m8 to be elements 928-921 respectively. Operation control 910 signals for the multiplexers 939 to pass through results from the adders without realigning them and so the results may be optionally saturated according to the operation and stored as 948-941 respectively.

Conclusion

The horizontal intra-add operation facilitates the efficient performance of butterfly computations. It further increases code density by eliminating the need for the rearrangement of data elements and the corresponding rearrangement operations. With the addition of some novel control and multiplexer circuitry, intra-add/subtract operations may be performed with the same arithmetic circuitry as inter-add/subtract operations.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A processor comprising:
   a storage area to store a first packed data operand and a second packed data operand; and an execution unit coupled to said storage area, the execution unit in response to receiving a single instruction to perform operations on data elements in said first packed data operand and said second packed data operand to generate a plurality of data elements in a packed data result, a first of said plurality of data elements in said packed data result being the result of an intra-arithmetic operation performed by the execution unit using a first pair of data elements of said first packed data operand and a second of said plurality of data elements in said packed data result being the result of an intra-arithmetic operation performed by the execution unit using a second pair of data elements of said second packed data operand.

2. The processor of claim 1, wherein each of said plurality of data elements in said packed data result being the result of an intra-add operation.

3. The processor of claim 2, wherein each of said plurality of data elements in said packed data result being the result of an intra-add operation with signed saturation.

4. The processor of claim 1, wherein each of said plurality of data elements in said packed data result being the result of an intra-subtract operation.

5. The processor of claim 4, wherein each of said plurality of data elements in said packed data result being the result of an intra-subtract operation with signed saturation.

6. The processor of claim 1, the execution unit, in response to said single instruction, overwriting said first packed data operand with said packed data result.

7. An apparatus comprising:
a first storage area for storing a first packed data operand, containing at least an A data element and a B data element packed together;
a second storage area for storing a second packed data operand containing at least a C data element and a D data element packed together; and
an arithmetic circuit responsive to execution of a single instruction to arithmetically combine the A data element and the B data element to generate a first result element of a third packed data, and to arithmetically combine the C data element and the D data element to generate a second result element of the third packed data.

8. The apparatus of claim 7 further comprising:
a multiplexer circuit to align at least one of the A data element and the B data element and to align at least one of the C data element and the D data element for an intra-arithmetic operation; and
an operation control unit, coupled with the multiplexer circuit, to signal for the alignment of said at least one of the A data element and the B data element and said at least one of the C data element and the D data element responsive to execution of said single instruction.

9. The apparatus of claim 8 wherein said operation control unit, is coupled with the arithmetic circuit, to signal for the combination of the A data element and the B data element and for the combination of the C data element and the D data element according to an intra-add operation.

10. The apparatus of claim 8 wherein said operation control unit, is coupled with the arithmetic circuit, to signal for the combination of the A data element and the B data element and for the combination of the C data element and the D data element according to an intra-subtract operation.

11. The apparatus of claim 8 wherein said operation control unit, is coupled with the arithmetic circuit, to signal for the combination of the A data element and the B data element and for the combination of the C data element and the D data element according to a saturating arithmetic operation.

12. The apparatus of claim 7 further comprising:
a decoder to decode said single instruction and to enable execution of said single instruction; and
a register file comprising said first storage area and said second storage area, to provide the A data element, the B data element, the C data element and the D data element responsive to the execution of said single instruction.

13. The apparatus of claim 12 further comprising:
a wireless communication device to send and receive digital data over a wireless network;
a memory to store digital data and software including the single instruction and to supply the single instruction to said decoder; and
an input output system responsive to said software to interface with the wireless communication device receiving data to process or sending data processed at least in part by said single instruction.

14. A system comprising:
a first storage area for storing a first packed data operand, containing at least an A data element and a B data element packed together;
a second storage area for storing a second packed data operand containing at least a C data element and a D data element packed together;
a decoder to decode a single instruction and to enable execution of said single instruction; an arithmetic circuit responsive to enabling execution of said single instruction to arithmetically combine the A data element and the B data element to generate a first result element of a third packed data, and to arithmetically combine the C data element and the D data element to generate a second result element of the third packed data;
a wireless communication device to send and receive digital data over a wireless network;
a memory to store digital data and software including the single instruction and to supply the single instruction to said decoder; and
an input output system responsive to said software to interface with the wireless communication device receiving data to process or sending data processed at least in part by said single instruction.

15. The system of claim 14, wherein each of said first and second result elements of the third packed data being the result of an intra-add operation.

16. The system of claim 15, wherein each of said first and second result elements of the third packed data being the result of an intra-add operation with signed saturation.

17. The system of claim 14, wherein each of said first and second result elements of the third packed data being the result of an intra-subtract operation.

18. A machine storage medium implemented in computer hardware that provides instructions that, when executed by a computer, cause the computer to perform a method, the method comprising:
decoding an instruction of a first instruction format identifying a horizontal arithmetic operation, a first source having a first plurality of packed data elements including elements X0 and X1 and a second source having a second plurality of packed data elements including elements Y0 and Y1;
executing the horizontal arithmetic operation on the first plurality of packed data elements and the second plurality of packed data elements to produce a first arithmetic result element from X0 and X1 and a second arithmetic result element from Y0 and Y1; and
storing a third plurality of packed data elements including a first element to represent said first arithmetic result element, and a second element to represent said second arithmetic result element.

19. The medium of claim 18, further comprising overwriting said first plurality of packed data elements in the first source with said third plurality of packed data elements.

20. The medium of claim 18, said third plurality of packed data elements storing elements to represent horizontal addi tion operations in a register specified by bits three through five of the instruction.

21. The medium of claim 20, said third plurality of packed data elements storing elements to represent saturated arithmetic sums, Y0+Y1 and X0+X1.

22. The medium of claim 20, said third plurality of packed data elements comprising 16-bit elements to represent sums, Y0+Y1 and X0+X1.

23. The medium of claim 20, said third plurality of packed data elements comprising 32-bit elements to represent sums, Y0+Y1 and X0+X1.

24. The medium of claim 18, said third plurality of packed data elements storing elements to represent horizontal subtraction operations.

25. The medium of claim 24, said third plurality of packed data elements storing elements to represent saturated arithmetic differences, Y0−Y1 and X0−X1.

26. The medium of claim 18, said third plurality of packed data elements storing elements to represent horizontal floating-point arithmetic operations.

* * * * *